US012443129B2

(12) United States Patent
Funatani et al.

(10) Patent No.: US 12,443,129 B2
(45) Date of Patent: Oct. 14, 2025

(54) IMAGE FORMING APPARATUS WITH SIMPLIFIED DEVELOPER REPLENISHMENT STRUCTURE AND THAT IS USER-FRIENDLY

(71) Applicant: CANON KABUSHIKI KAISHA, Tokyo (JP)

(72) Inventors: Kazuhiro Funatani, Kanagawa (JP); Masatake Tanaka, Kanagawa (JP); Kentaro Yamawaki, Shizuoka (JP); Kenichi Iida, Tokyo (JP); Shinsuke Kobayashi, Kanagawa (JP); Kensuke Umeda, Kanagawa (JP); Takanori Watanabe, Kanagawa (JP); Ai Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/596,287

(22) Filed: Mar. 5, 2024

(65) Prior Publication Data

US 2024/0210854 A1 Jun. 27, 2024

Related U.S. Application Data

(63) Continuation of application No. 17/938,099, filed on Oct. 5, 2022, now Pat. No. 11,947,280, which is a (Continued)

(30) Foreign Application Priority Data

Nov. 14, 2018 (JP) ................................ 2018-213995

(51) Int. Cl.

| | |
|---|---|
| ***G03G 15/08*** | (2006.01) |
| ***G03G 9/08*** | (2006.01) |
| ***G03G 9/093*** | (2006.01) |

(52) U.S. Cl.

CPC ....... *G03G 15/0865* (2013.01); *G03G 9/0821* (2013.01); *G03G 9/09328* (2013.01); (Continued)

(58) Field of Classification Search

CPC ............. G03G 9/0821; G03G 9/09328; G03G 15/0856; G03G 15/0865; G03G 15/0877; G03G 15/0889

See application file for complete search history.

(56) References Cited

U.S. PATENT DOCUMENTS

| | | | | |
|---|---|---|---|---|
| 5,331,381 A * | 7/1994 | Ota | G03G 15/0822 | 399/258 |
| 2014/0027012 A1* | 1/2014 | Saitoh | G03G 15/0867 | 141/10 |
| 2018/0284679 A1* | 10/2018 | Fukuma | G03G 21/1633 | |

FOREIGN PATENT DOCUMENTS

| | | |
|---|---|---|
| JP | H07072725 A | 3/1995 |
| JP | H07134476 A | 5/1995 |

(Continued)

*Primary Examiner* — Hoang X Ngo

(74) *Attorney, Agent, or Firm* — Canon U.S.A., Inc. IP Division

(57) ABSTRACT

A mechanism that enables developer replenishment by a simpler structure and a mechanism that enables more user-friendly developer replenishment are provided. An attachment port to which a developer supply bottle containing a developer stored therein is detachably attachable is disposed in an interior of an image forming apparatus. The developer supply bottle can be attached when the cover is in an open state. According to this image forming apparatus, when the developer supply bottle is attached to the attachment port, the developer inside the developer supply bottle moves into a developer housing chamber by its own weight.

13 Claims, 8 Drawing Sheets

Related U.S. Application Data continuation of application No. 17/318,622, filed on May 12, 2021, now Pat. No. 11,493,859, which is a continuation of application No. PCT/JP2019/043574, filed on Nov. 7, 2019.

(52) U.S. Cl.
CPC ..... *G03G 15/0856* (2013.01); *G03G 15/0877* (2013.01); *G03G 15/0889* (2013.01)

(56) References Cited

FOREIGN PATENT DOCUMENTS

| | | | |
|---|---|---|---|
| JP | 2014041261 | A | 3/2014 |
| KR | 20060088414 | A | 8/2006 |

* cited by examiner

IMAGE FORMING APPARATUS WITH SIMPLIFIED DEVELOPER REPLENISHMENT STRUCTURE AND THAT IS USER-FRIENDLY

CROSS-REFERENCE TO RELATED APPLICATIONS

The present application is a continuation of U.S. patent application Ser. No. 17/938,099, filed on Oct. 5, 2022, which is a Continuation of U.S. patent application Ser. No. 17/318,622, filed on May 12, 2021 and issued as U.S. Pat. No. 11,493,859 on Nov. 8, 2022, which is a Continuation of International Patent Application No. PCT/JP2019/043574, filed Nov. 7, 2019, which claims the benefit of Japanese Patent Application No. 2018-213995, filed Nov. 14, 2018, all of which are hereby incorporated by reference herein in their entirety.

BACKGROUND

Technical Field

The present invention relates to an image forming apparatus, such as a laser printer, a copy machine, or a facsimile machine, that forms a recorded image by transferring a toner image, which has been formed on an image bearing member by an electrophotographic method or the like, onto a transfer material.

Background Art

In general, an electrophotographic image forming apparatus forms an image by forming a developer image (toner image) on a surface of a photosensitive drum serving as an image bearing member and transferring the developer image onto a transfer material serving as a transfer medium. A variety of developer replenishing systems have been proposed. A representative example is a process cartridge. According to a process cartridge system, a photosensitive drum and a developer container are integrated, and the process cartridge may be replaced with new one when the developer has run out. This is advantageous since the user can easily perform maintenance.

Meanwhile, a toner replenishing system that replenishes a new toner to a developing device when the developing device is out of toner is also known. For example, PTL 1 describes a toner replenishing container detachably attachable to an image forming apparatus, and when the toner replenishing container is attached to the image forming apparatus, the toner is conveyed to a developing container from the toner replenishing container via a toner conveying channel equipped with a conveying screw.

However, known toner replenishing systems have the following issues. That is, for example, it is necessary to provide a toner conveying channel equipped with a conveying screw, and this has caused the apparatus to be more complicated in structure or larger in size.

CITATION LIST

Patent Literature

PTL 1 Japanese Patent Laid-Open No. 8-30084

SUMMARY OF INVENTION

According to an aspect of the present invention, there is provided an image forming apparatus that includes an image bearing member; developer bearing member; a stirring member that is movable; a frame that supports the developer bearing member and constitutes a developer housing chamber that contains a developer to be supplied to the developer bearing member; and a cover movable between a first position and a second position. The developer bearing member develops, by using the developer, an electrostatic latent image formed on the image bearing member by an exposing unit. The developer housing chamber has an attachment port to which a developer supplying container with a developer stored therein is detachably attached and positioned. The first position is a position at which the cover covers the attachment port, and the second position is a position at which the attachment port is accessible from outside. When the cover is at the second position and the developer supplying container is attached to the attachment port so as to allow an interior of the developer supplying container and the developer housing chamber to communicate with each other, the developer stored in the developer supplying container is moved to the developer housing chamber due to own weight of the develop. In a state in which the developer supplying container is attached to the attachment port, as viewed in a vertical direction of gravitational force, an upper portion of the developer supplying container is located on an outward upper side with respect to the first position in the image forming apparatus; and when the developer supplying container is detached from the attachment port, the cover is movable from the second position to the first position.

Further features of the present invention will become apparent from the following description of exemplary embodiments with reference to the attached drawings.

DESCRIPTION OF EMBODIMENTS

The embodiments of the present invention will now be described with reference to the drawings. The embodiments described below do not limit the invention as set forth by the claims, and not all of the combinations of the features described in the embodiments are necessarily essential to the solution provided by the present invention.

First Embodiment

Overall Structure of Image Forming Apparatus

Figure 1A:
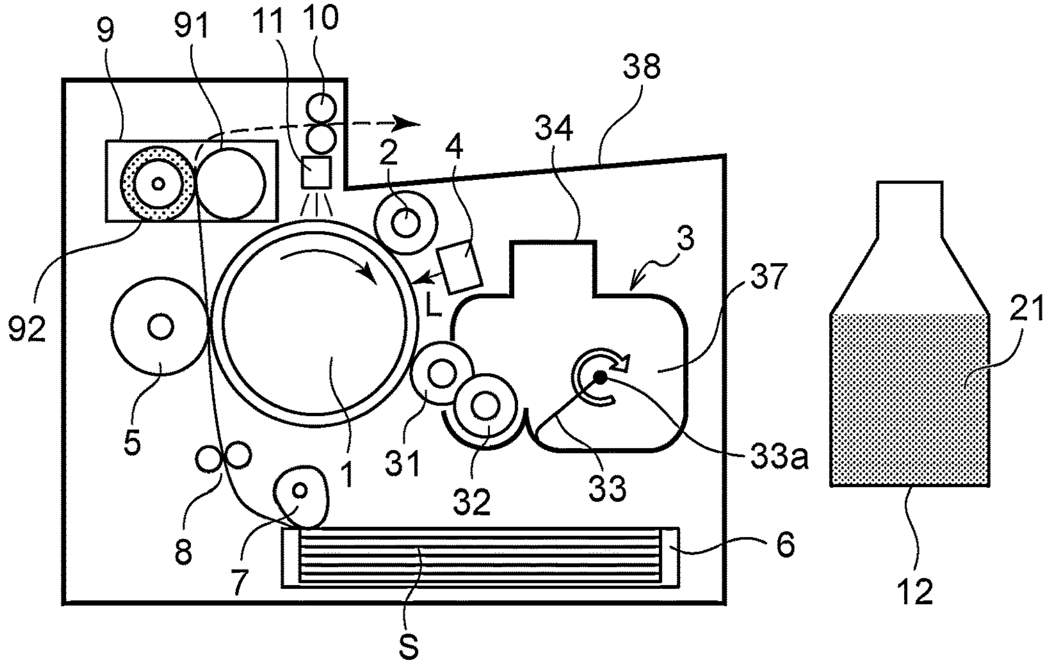
FIG. 1A is a diagram illustrating cross-sectional structures of an image forming apparatus and a toner bottle according to an embodiment.

FIG. 1A illustrates a schematic structure of an image forming apparatus that serves as a monochrome printer.

The image forming apparatus of this embodiment includes a photosensitive drum 1, which is a cylinder-shaped photoreceptor that serves as an image bearing member. A charging roller 2 serving as a charging unit and a developing device 3 serving as a developing unit are disposed around the photosensitive drum 1. An exposing device 4 that serves as an exposing unit is disposed between the charging roller 2 and the developing device 3 as viewed in the downward direction of the drawing. A transfer roller 5 is in pressure-contact with the photosensitive drum 1.

A toner is in a developer housing chamber 37 of the developing device 3. The toner of this embodiment has a particle diameter of 6 μm, and the regular charging polarity thereof is negative polarity.

The photosensitive drum 1 of this embodiment is a negatively chargeable organic photoreceptor. The photosensitive drum 1 includes a drum-shaped aluminum substrate and a photosensitive layer on the substrate, and is driven by a driving device (not illustrated) to rotate at a particular process speed in the arrow direction (clockwise) in the drawing. In this embodiment, the process speed is equivalent to the circumferential velocity (surface moving speed) of the photosensitive drum 1.

The charging roller 2 contacts the photosensitive drum 1 at a particular pressure-contact force, and forms a charged portion. A charging high-voltage power supply (not illustrated) serving as a charging voltage supplying unit applies a particular charging voltage to the photosensitive drum 1, and the surface of the photosensitive drum 1 is thereby evenly charged to a particular potential. In this embodiment, the photosensitive drum 1 is negatively charged by the charging roller 2.

The exposing device 4 of this embodiment is a laser scanner device. The exposing device 4 outputs a laser beam corresponding to image information input from an external device, such as a host computer, and scans and exposes the surface of the photosensitive drum 1. Due to this exposure, an electrostatic latent image (electrostatic image) corresponding to the image information is formed on the surface of the photosensitive drum 1. The exposing device 4 is not limited to a laser scanner device, and, for example, an LED array including LEDs lined up in the longitudinal direction of the photosensitive drum 1 may be employed instead.

In this embodiment, a contact development method is used as the development method of the developing device 3. In the developing device 3, a developing roller 31 that serves as a developer bearing member is supported by a frame (housing) that constitutes the developer housing chamber 37 that contains the toner. A toner supply roller 32 that serves as a developer supplying unit is also supported by the frame. The electrostatic latent image formed on the photosensitive drum 1 is developed into a toner image by using a toner, which is conveyed by the developing roller 31, at an opposing portion (development nip) between the developing roller 31 and the photosensitive drum 1. During this process, a developing voltage is applied to the developing roller 31 from a developing high-voltage power supply (denoted by reference numeral 103 in FIG. 5) serving as a developing voltage applying unit. In this embodiment, the electrostatic latent image is developed by a reversal development process. That is, a toner having the same polarity as the charging polarity of the photosensitive drum 1 is caused to adhere to a portion of the charged photosensitive drum 1 where the charges have decayed due to exposure, and the electrostatic latent image is thereby developed into a toner image.

Moreover, the toner supply roller 32 that supplies the toner rotatably abuts the developing roller 31. In this embodiment, a one-component non-magnetic contact development method is employed. Alternatively, a two-component non-magnetic contact/non-contact development method may be employed. In addition, a one-component magnetic contact/non-contact development method or a two-component magnetic contact/non-contact development method may be employed as the development method. A polymerized toner formed by a polymerization method is employed as one example of the developer in this embodiment.

A stirring blade 33 that serves as a stirring member is installed inside the developer housing chamber 37. The stirring blade 33 sends the toner onto the developing roller 31 and the toner supply roller 32 as the stirring blade 33 rotates about a rotating shaft 33*a* by the driving force supplied from the driving device (not illustrated) as viewed in a cross section. The stirring blade 33 (the stirring member) may receive the driving force directly from the driving device (not illustrated). Also, The stirring blade 33 (the stirring member) may receive the driving force from the driving gear (not illustrated) that transmits the driving force from the driving device (not illustrated) As illustrated in the drawing, the stirring blade 33 rotates clockwise about the rotating shaft 33*a*. More specifically, the toner within the rotation radius of the stirring blade 33 is pushed and moved by the stirring blade 33. Some part of the moved toner is sent onto the developing roller 31 and the toner supply roller 32. The stirring blade 33 is, for example, formed of a sheet-shaped member that extends in the longitudinal direction of the developing roller 31, and, in such a case, the sheet pushes the toner within the rotation radius as viewed in a cross section, and causes the toner to move. Then, some part of the moved toner is sent onto the developing roller 31 and the toner supply roller 32. Also, as illustrated in the drawing, the stirring blade 33 has a shape which extends in a direction intersecting a rotational direction of the stirring blade 33 and feeds the toner toward the developing roller 31 and the toner supply roller 32. The stirring blade 33 is only one which is disposed in a space upstream from the photosensitive drum 1 and downstream from the supply port of the toner bottle 12 when the toner bottle 12 is attached to the opening 34 (the attachment port part) with respect to a moving direction of the toner by the gravitational force. There is only one stirring blade 33 in the space. In the present embodiment, disposing only one stirring blade 33 in the space means that the stirring blade 33 that can feed the toner toward the developing roller 31 and the toner supply roller 32 is substantially only one.

The stirring blade 33 also has a function of circulating the toner not used in the development and stripped from the developing roller 31 so that the extent of degradation of the toner in the developer housing chamber 37 is made uniform. The stirring blade 33 also has a function of leveling the toner that has fallen from a toner bottle 12 by its own weight and moved to the developer housing chamber 37. The quantity of the remaining toner can be accurately detected by leveling the replenished toner with the stirring blade 33.

The transfer roller 5 can be formed of an elastic member such as sponge rubber composed of polyurethane rubber, ethylene-propylene-diene rubber (EPDM), nitrile butadiene rubber (NBR), or the like.

The transfer roller 5 is pressed against the photosensitive drum 1 to form a transfer portion where the photosensitive drum 1 and the transfer roller 5 make pressure-contact. A transfer high-voltage power supply (not illustrated) serving as a transfer voltage applying unit is connected to the transfer roller 5, and a particular voltage is applied at a particular timing.

In synchronization with the timing at which the toner image formed on the photosensitive drum 1 reaches the transfer portion, a transfer material S in a cassette 6 is fed by a paper feed unit 7, passes through a resist roller pair 8, and conveyed to the transfer portion. The toner image formed on the photosensitive drum 1 is transferred onto the transfer material S by the transfer roller 5 to which a particular transfer voltage is applied by the transfer high-voltage power supply.

After the transfer of the toner image, the transfer material S is conveyed to a fixing device 9. The fixing device 9 is a film heating-type fixing device equipped with a fixing film 91 having built-in fixing heater (not illustrated) and a built-in thermistor (not illustrated) for measuring the temperature of the fixing heater, and a pressurizing roller 92 for making pressure-contact with the fixing film 91. The toner image is fixed by heating and pressurizing of the transfer material S, and the transfer material S is discharged from the apparatus via a discharge roller pair 10.

A pre-exposure device 11 that serves as a charge erasing unit that erases charges on the photosensitive drum 1 is disposed downstream of the transfer portion and upstream of the charged portion in the direction of the rotation of the photosensitive drum 1. The pre-exposure device 11 erases the surface potential of the photosensitive drum 1 before the photosensitive drum 1 enters the charged portion so that discharge occurs stably in the charged portion.

The transfer residual toner that has not been transferred onto the transfer material S and remains on the photosensitive drum 1 is removed by the following process. The transfer residual toner is a mixture of a positively charged toner and a negatively charged but not sufficiently charged toner. When the charges on the photosensitive drum 1 after transfer are erased by the pre-exposure device 11, discharging evenly occurs during charging, and thus the transfer residual toner again becomes negatively charged. The residual transfer residual toner that has been negatively charged again in the charged portion reaches the developing portion as the photosensitive drum 1 rotates. The behavior of the transfer residual toner that has reached the developing portion will now be described by distinguishing the transfer residual toner that lies in an exposed portion of the photosensitive drum 1 and the transfer residual toner that lies in a non-exposed portion of the photosensitive drum 1. In the developing portion, the transfer residual toner attached to a non-exposed portion of the photosensitive drum 1 migrates to the developing roller 31 due to the potential difference between the developing voltage and the potential of the non-exposed portion of the photosensitive drum 1, and is recovered into the developer housing chamber 37. The toner recovered to the developer housing chamber 37 is again used for forming an image. In contrast, the transfer residual toner attached to an exposed portion of the photosensitive drum 1 does not migrate to the developing roller 31 from the photosensitive drum 1 in the developing portion, but migrates to the transfer portion together with the developed toner from the developing roller 31, is transferred to the transfer material S, and is removed from the photosensitive drum 1.

In this embodiment, the transfer residual toner is recovered into the developing device 3 and reused; alternatively, the transfer residual toner may be recovered by using a known cleaning blade that abuts the photosensitive drum 1 so that the transfer residual toner is not used again. In either case, the effect of this embodiment remains unaffected. However, naturally, according to the structure of this embodiment, a recovery container that temporarily stores the recovered transfer residual toner is not necessary, and thus the size of the apparatus can be kept compact. Moreover, since the transfer residual toner is reused, the printing cost can be reduced. Next, replenishing the developer into the developer housing chamber from a developer supply bottle by using the weight of the developer is discussed.

Replenishing Using Developer Weight

The developing device 3 installed in the apparatus has an opening 34 that serves as a port that fits a toner bottle (developer supply bottle). The opening 34 is located inside the apparatus body with respect to the outer casing of the apparatus body, and the toner can be replenished through the opening 34. The supply port of the toner bottle 12 and the opening 34 are configured so that the toner bottle is detachably attachable to the opening 34. The stirring blade 33 that serves as a moving member located closest to the opening 34 is disposed inside the frame that constitutes the developer housing chamber 37. As a result, the level of the replenished toner in the longitudinal direction of the developing roller is rapidly evened out, and printing operation can start rapidly after toner replenishment. Other examples of the rotating and moving members inside the frame of the developer housing chamber 37 are the developing roller 31 and the toner supply roller 32.

In the description below, the term "toner bottle" is used; however, it is sufficient for the toner bottle to be attachable to the apparatus and to have a function of housing the developer (toner) to be replenished or supplied to the developing device. Thus, the toner bottle can be addressed as a "developer container", a "developer supplying container", or the like.

Figure 1B:
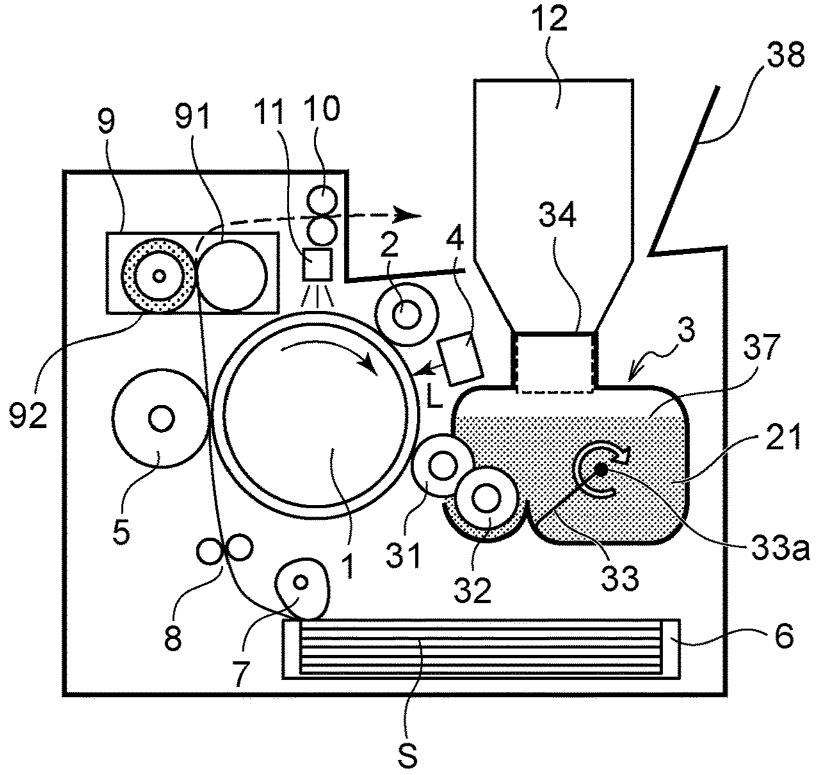
FIG. 1B is another diagram illustrating cross-sectional structures of the image forming apparatus and the toner bottle according to the embodiment.
Figure 4A:
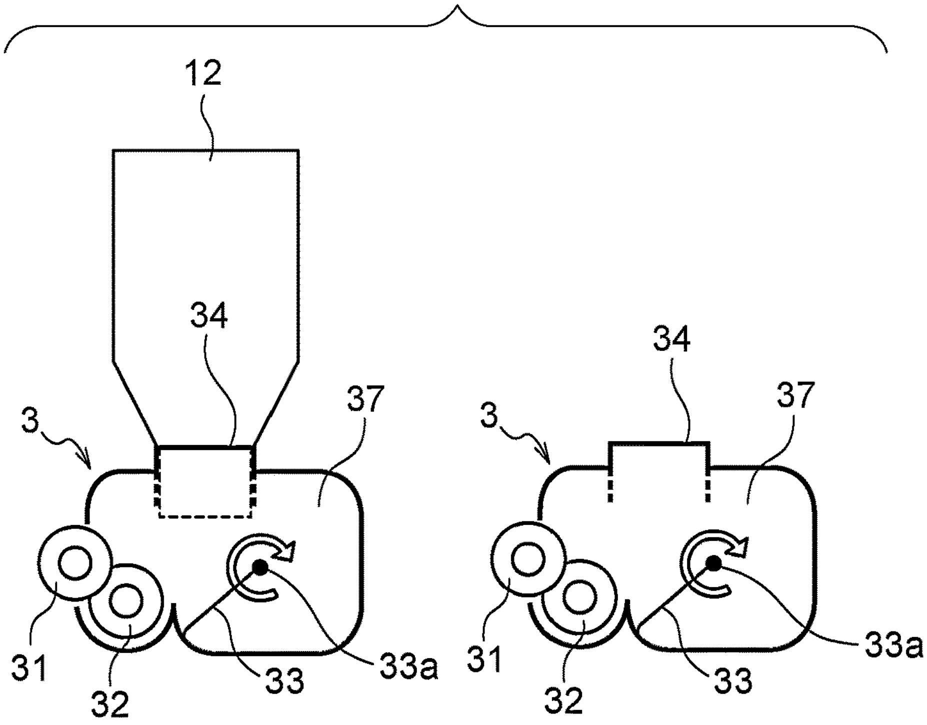
FIG. 4A is a diagram illustrating a developing device having an opening according to another embodiment.
Figure 4B:
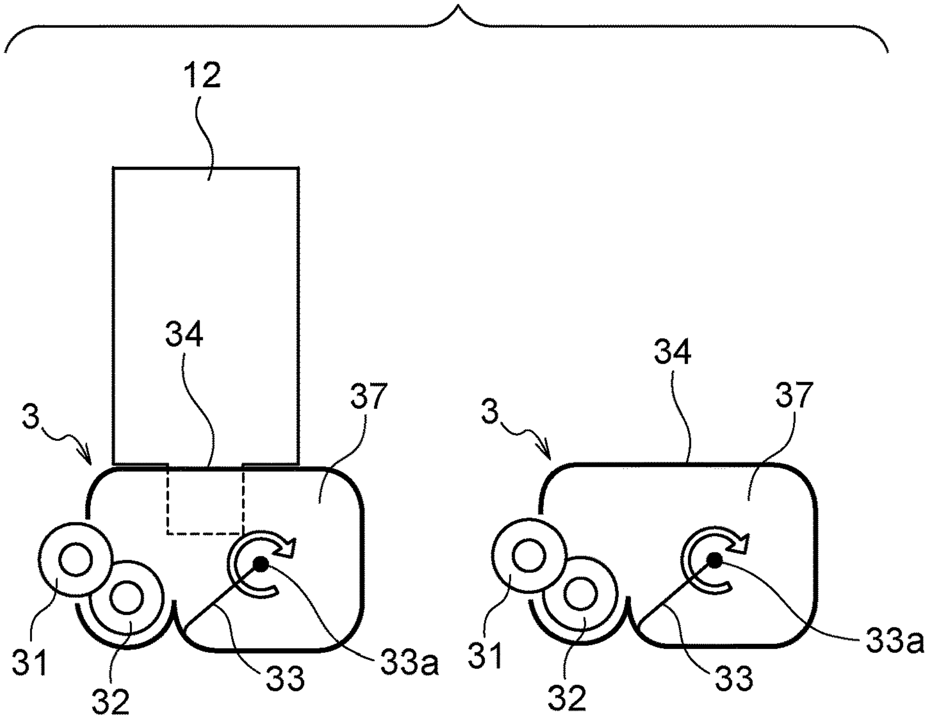
FIG. 4B is a diagram illustrating another developing device having an opening according to another embodiment.

Here, the term "attach" used in this embodiment is described in detail. As illustrated in FIGS. 1A, 1B, 4A and 4B described below, "attach" means the state in which the position of the supply port of the toner bottle 12 is set with respect to the opening 34 in the horizontal direction and the vertical direction. In FIG. 1B, the position is set as the tip of the toner bottle 12 fits into and abuts the developer housing chamber 37. In FIG. 4B, the position is set as part of the surface of the toner bottle 12 abuts the developer housing chamber 37. The mechanism of attaching the toner bottle 12 to the body is not limited to this form. Various mechanisms for setting the position the supply port of the toner bottle 12 with respect to the opening 34 can be employed.

Moreover, the structure of a developer storing unit of a toner bottle detachably attachable to the image forming apparatus is typically formed of a resin; alternatively, the wall thickness of the resin may be reduced, and a flexible sheet that easily deforms by the user's gripping action may be used. The anticipated wall thickness of the flexible sheet is, for example, about 0.03 to 1 mm. By decreasing the wall thickness of the sheet, a developer replenishing container that has a bag-shaped developer housing portion can be provided. When a paper material is used to form a flexible sheet that constitutes the developer housing portion, an environment-friendly developer replenishing container can be provided. Furthermore, the supply port of the toner bottle 12 may be formed of a resin; alternatively, as an environmental measure, a high-strength cardboard may be used to form the supply port.

Figure 3A:
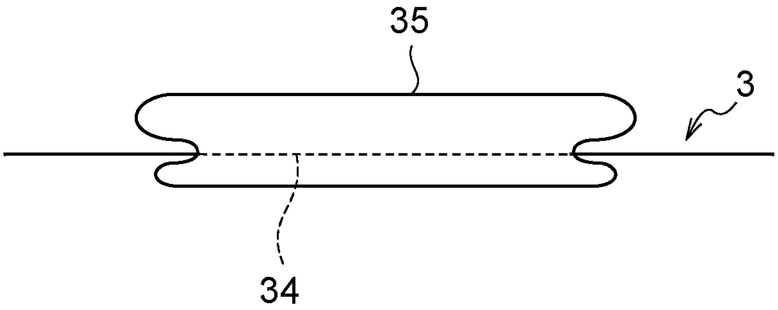
FIG. 3A is a diagram illustrating an example of a cap for an opening according to an embodiment.
Figure 3B:
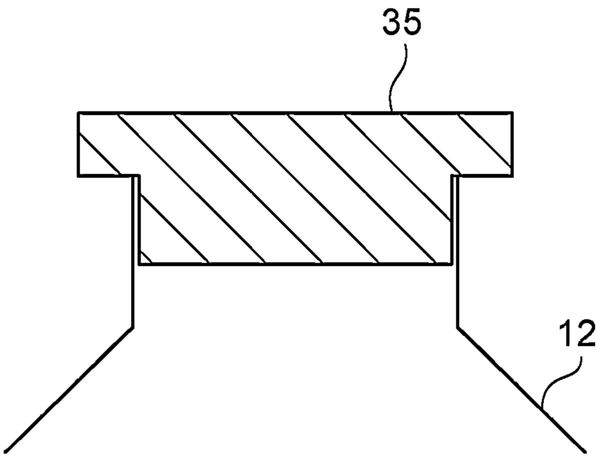
FIG. 3B is a diagram illustrating another example of the cap for an opening according to an embodiment.
Figure 3C:
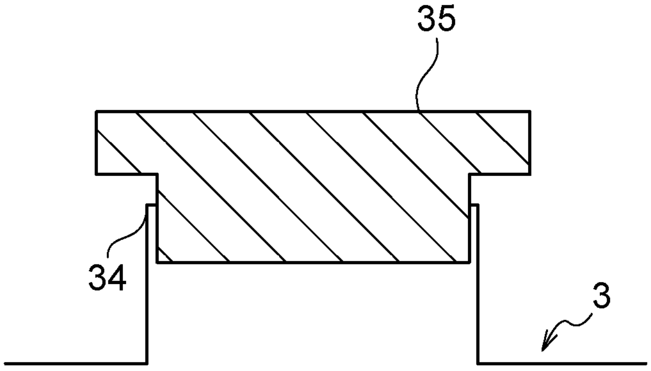
FIG. 3C is a diagram illustrating another example of the cap for an opening according to an embodiment.

In order for the user to attach the toner bottle 12 to the image forming apparatus, the user moves a cover 38 from a first position to a second position and opens the cover 38 so that the user can have access from the outside to the opening 34 that serves as an attachment port. The cover 38 is configured to be movable between the first position and the second position (also referred to as an "open position"). The first position is a position assumed during image formation, and the cover 38 at the first position covers the interior (attachment port) of the apparatus, as illustrated in FIG. 1A. The second position is a position that enables the user to access the interior of the image forming apparatus from the outside. When the cover 38 is at the second position, the user can access the interior of the apparatus (attachment port), and can attach the toner bottle 12 to the opening 34 or detach the toner bottle 12 from the opening 34. When a cap 35 is attached to the opening 34, the user removes the cap 35 from the opening 34. FIGS. 3A to 3C illustrate some examples of the cap 35 for the opening 34. The cap 35 may have any shape or be of any type as long as that member can seal the opening 34 and keeps the toner inside the developer housing chamber 37.

The cover 38 serving as an openable-closable member swings on a hinge at the left side of the cover in the drawing, and covers or exposes the interior of the apparatus. However, this structure is not limiting. For example, a slide door may be employed. Alternatively, a double door that has two doors hinged to respective opposing sides of an opening that is formed in the image forming apparatus body when the cover is open. Various opening-closing structures can be employed for the cover 38.

Next, as illustrated in FIG. 1B, when the toner bottle 12 is attached to the opening 34 while the cover 38 is at the opening position (second position), the toner moves to the developer housing chamber 37 by its own weight, and replenishment is achieved. More specifically, when the toner bottle 12 is attached to the opening 34, the developer housing chamber 37 communicates with the inner space of the toner bottle 12, and the toner stored inside the toner bottle 12 moves into the developer housing chamber 37 by its own weight. When the all toner (developer) or the predetermined amount of toner for the one toner replenishment in the toner bottle 12 is supplied to the developer housing chamber 37 after the toner replenishment is urged, the level of a toner 21 is above the rotating shaft 33*a* with respect to the direction of gravitational force. In other words, the rotating shaft 33*a* is under the level of the toner 21 after replenishment with respect to the direction of gravitational force. Here, after the toner is replenished, each of levels of the toner in the developer housing chamber 37 are not completely the same as viewed along the longitudinal direction of the developing roller 31. So, in this embodiment, the level of the toner 21 means average of the levels of toner 21 in the developer housing chamber 37 after the toner is replenished.

As such, in this embodiment, the toner is caused move from the toner bottle 12 to the developer housing chamber 37 due to the gravitational force. Another conceivable toner replenishing method is a method that involves supplying a toner replenishing bottle to a toner replenishing channel which is different from the developer housing chamber 37 and is equipped with a conveying screw, and moving the toner to the developer housing chamber 37 via the toner replenishing channel by using the conveying screw. However, in such a case, the size of the apparatus increases due to the toner replenishing channel. In contrast, according to the toner replenishing system of this embodiment, the size of the apparatus can be reduced. Moreover, in order to supply the replenishing toner to the toner conveying channel mentioned above, it takes time to complete conveying of the toner via the toner conveying channel, and the user has to wait for the restart of printing. This embodiment provides an improvement regarding this point also.

As illustrated in FIG. 1B, while the toner bottle 12 is attached to the opening 34, the upper portion of the toner bottle 12 in the direction of gravitational force projects from the outer casing of the apparatus body toward the outward upper side (upper side in the direction of gravitational force). Thus, the toner bottle 12 does not have to be completely contained in the image forming apparatus, and the size of the image forming apparatus can be reduced. Moreover, since the toner bottle 12 projects outward in the vertical direction of gravitational force during replenishing, the cover 38 can assume the first position, which is a close position, when the toner bottle 12 is detached from the opening 34 and removed from the apparatus. The "close position" refers to a position assumed by the cover 38 during image formation, and refers to a position at which the cover 38 covers the opening 34 or the interior of the image forming apparatus.

Furthermore, as illustrated in FIG. 1A, the operation may be stopped while the stirring blade 33 is in a tilted state so that, during the toner replenishing, the stirring blade 33 guides the replenished toner to the developing roller 31 and the toner supply roller 32. As such, when the stirring blade 33 serves as a toner guiding member, the toner can be replenished to the developing roller 31 more rapidly.

The shape of the supply port of the toner bottle 12 and the shape of the opening 34 are not limited to the ones illustrated in FIGS. 1A and 1B as long as the supply port and the opening 34 are detachably attachable to each other. For example, in FIG. 4A, the opening 34 has a shape projecting from the surface of the developer housing chamber 37. The inner wall of the projecting portion extends to the interior of the developer housing chamber 37. The inner wall guides the surface (outer peripheral surface) of the supply port of the toner bottle 12 downward, and sets the position of the toner bottle 12 with respect to the developer housing chamber 37. In other words, since part of the side surface of the toner bottle 12 abuts with the edge of the opening 34, the downward movement of the toner bottle 12 is restricted. The side wall extending to the interior is indicated by a broken line in FIG. 4A.

Alternatively, as illustrated in FIG. 4B, the toner bottle 12 may have a toner bottle surface (portion) that abuts with the surface of the developer housing chamber 37, and the downward movement of the toner bottle 12 may be restricted by the abutment between these surfaces. The abutment between these surfaces also determines the position of the toner bottle 12 in the horizontal direction.

Amount of the Developer Loaded into the Toner Bottle

The amount of the developer (toner) loaded into the toner bottle 12 will now be described. The amount of the toner to be loaded into the toner bottle 12 can be appropriately selected; however, in this embodiment, the amount of the toner loaded into the toner bottle 12 may be A [g] or more and B [g] or less. Here, A [g] is the amount of the toner (developer) contained on a lower side (in a lower portion) of the developer housing chamber 37 with respect to a horizontal plane that includes the highest position (highest point) of the developing roller 31 when the developing device 3 assumes the posture for image formation. In other words, even when the toner replenishing is performed on an empty, toner-depleted developer housing chamber 37, the toner can be replenished to a level at which the developing roller 31 is covered with the replenished toner. When the toner 21 stored inside the toner bottle 12 illustrated in FIG. 1A is supplied to the developer housing chamber 37 illustrated in FIG. 1A, all of the toner 21 inside the toner bottle 12 is supplied to the developer housing chamber 37 as illustrated in FIG. 1B.

Figure 2A:
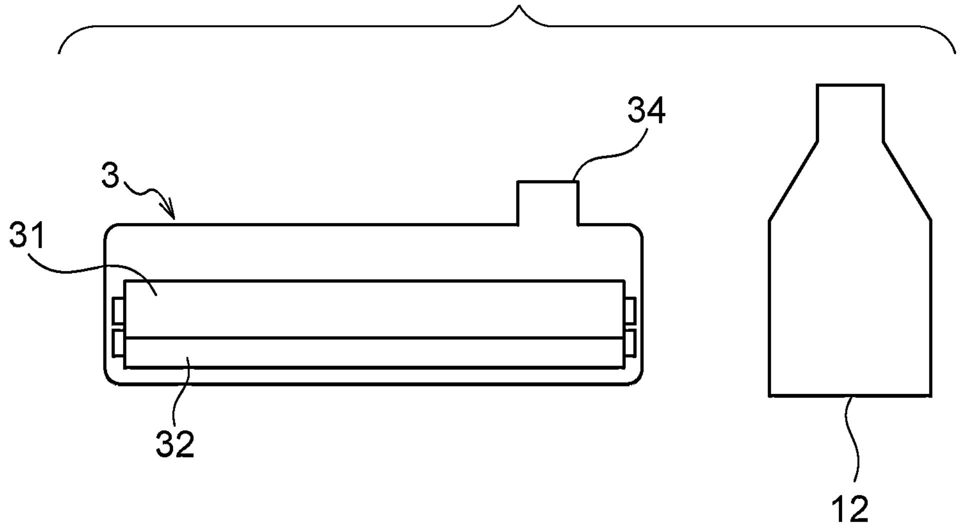
FIG. 2A is a diagram illustrating a developing device and a toner bottle as viewed in a direction orthogonal to a longitudinal direction of a developing roller according to an embodiment.

FIG. 2A illustrates the relationship between the developing device 3 and the toner bottle 12 as viewed in a direction orthogonal to the longitudinal direction of the developing roller 31. The developer housing chamber 37 extends in the longitudinal direction and has an enough volume to contain all of the toner 21 stored inside the toner bottle 12.

Figure 2B:
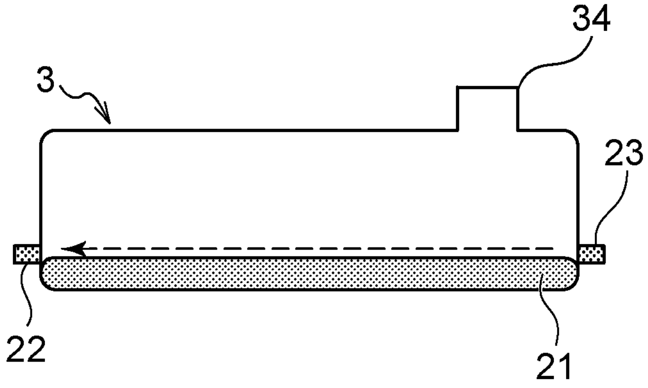
FIG. 2B is a diagram illustrating a structure for detecting whether the amount of the remaining developer contained in a developer housing chamber is below a particular amount.

Furthermore, B [g] represents the difference between the maximum toner amount that can be loaded into the developer housing chamber 37 and a threshold amount of the residual toner contained in the developer housing chamber 37 at the time when the apparatus starts to urge toner replenishment to the user. FIG. 2B illustrates a structure for detecting whether the amount of the remaining developer contained in the developer housing chamber 37 is below a particular amount. This structure includes a light-receiving unit 22 that receives light emitted from a light-emitting unit 23. When the amount of the toner contained in the developer housing chamber 37 is sufficiently large, the light from the light-emitting unit 23 is blocked by the toner, and the light-receiving unit 22 does not receive light. When the amount of the remaining toner is below a particular amount (particular volume), the light-receiving unit 22 receives light from the light-emitting unit 23, and a controller 101 detects that the amount of the remaining toner is below the particular amount. The controller 101 identifies an output signal from the light-receiving unit 22 input via a signal line not illustrated in the drawing, and thereby detects and senses that the amount of the remaining toner is below the particular amount. When the amount of the remaining toner is detected while the stirring blade 33 in the developer housing chamber 37 is rotated, the length of time the light is blocked by the toner stirred by the stirring blade 33 changes depending on the amount of the remaining toner. The controller 101 may estimate the amount of remaining toner by a difference in the length of time light is blocked or the length of time light is received.

When the controller 101 detects that the light-receiving unit 22 has received light, the controller 101 sends an output urging toner replenishment to an external device via an output I/F not illustrated in the drawing. In other words, the controller 101 functions as an output device that sends an output urging toner replenishment when the controller 101 detects that the amount of the remaining toner is reduced to an amount below the particular amount. Examples of the external device include a display device, a speaker, and a data transmitter. The output I/F may be wired or non-wired.

It should be noted that, as with B [g], A [g] may be the difference between the amount of the toner required to cover the developing roller 31 in an empty developer housing chamber 37 and the amount of the remaining toner in the developer housing chamber 37 at the time when urging of toner replenishment starts. Alternatively, as with A [g], B [g] may be the maximum amount of the toner that can be loaded into an empty developer housing chamber 37. Settings of A [g] and B [g] vary.

As described above, even when the user urged to replenish the toner replenishes the toner by replenishing all of the developer contained in a stored toner bottle 12 into the developer housing chamber 37, the amount of the developer in the developer housing chamber 37 does not reach the maximum amount of the developer that can be contained in the developer housing chamber 37. Thus, when the user removes the toner bottle 12 from the image forming apparatus after toner replenishment, toner spilling can be avoided. Moreover, after the toner bottle is removed from the image forming apparatus after the toner replenishing, a cap 35 as illustrated in FIG. 3A, 3B, or 3C is fitted into the opening 34 of the developer housing chamber 37. The structure of the cap 35 can be simplified since it is the presumption that the toner bottle is empty.

Keeping the Apparatus in Deactivated State

The image forming apparatus is equipped with an optical sensor or a mechanical sensor (not illustrated in the drawings) for detecting that the cover 38 is open. When the controller 101 receives the signal indicating that the cover is open, the controller 101 does not permit image forming operation. Even if a print command is input from the outside, image formation involving driving of a processing unit, such as the photosensitive drum 1, is not allowed. Instead of detecting that the cover is open, the attached state of the toner bottle 12 may be detected. In other words, when the sensor (not illustrated in the drawings) detects that the toner bottle 12 is attached to the opening 34, the controller 101 does not permit image formation that involves driving of a processing unit, such as a photosensitive drum 1. The image forming apparatus may detect the attached state of the toner bottle 12 through detecting that the mechanical sensor installed in the apparatus body is depressed by the toner bottle 12. Moreover, when a memory unit (including at least a memory element and an electrical contact portion) is installed in the toner bottle 12, a memory reading device is installed to the apparatus body. In such a case, the image forming apparatus may, for example, determine whether a particular communication can be carried out between the memory reading device and the memory unit of the toner bottle 12, and then determine on the basis of this result whether the toner bottle 12 is attached or not.

As described above, according to this embodiment, a developer replenishing system can be configurated as a simpler structure that involves moving a toner from the toner bottle 12 to the developer housing chamber 37 by using the weight of the toner itself. Moreover, more user-friendly toner replenishing can be realized. For example, image formation can be resumed rapidly after toner replenishment, and the downtime can be reduced. Moreover, for example, a complicated toner conveying channel and the like are not needed, and thus the size of the image forming apparatus and the cost can be reduced. Furthermore, for example, since the toner is replenished by attaching the toner bottle 12 to the opening 34 located inside the image forming apparatus, issues that are likely to occur with toner replenishing-type image forming apparatus, such as toner scattering, can be avoided.

Second Embodiment

The structure of the image forming apparatus of this embodiment is the same as in the first embodiment, and the detailed description therefor is omitted. In this embodiment, the image issues that arise during toner replenishment and the countermeasures therefor are described.

This embodiment provides a toner replenishing system for suppressing occurrence of replenishment fogging. First, a phenomenon known as "replenishment fogging" that occurs due to the difference in properties between a new toner replenished during toner replenishment and an old toner remaining in the developing device 3 is described.

Replenishment Fogging

The mechanism with which replenishment fogging occurs will now be described. A new toner having surface layers that are not yet worn can easily retain charges, and thus the amount of charges retained by the toner per unit weight is large (hereinafter, this amount is referred to as the "toner triboelectrification"). In contrast, the toner that has been under repeated pressure in the developing portion or the like has worn surface layers, and external additives such as silica become embedded in the toner base (toner particles) or detach from the toner base, thereby degrading the chargeability of the toner. The toner with degraded chargeability retains less charges, and the toner triboelectrification is small.

Furthermore, when the new toner and the old toner are mixed, the influence of the difference in chargeability between the new and old toners is significant. That is, when the new toner contacts the old toner, the triboelectrification of the new toner becomes larger than when the new toner is used alone, and the triboelectrification of the old toner becomes lower than when the old toner is used alone. As a result, the triboelectrification of the old toner becomes excessively low, and the electrical field can barely keep the old toner on the developing roller 31, resulting in fogging.

As described in the first embodiment, since the replenished new toner comes into direct contact with the old toner in the developing device 3 according to the structure of the image forming apparatus, occurrence of replenishment fogging needs to be addressed carefully.

Characteristic Features of this Embodiment

In this embodiment, in order to prevent replenishment fogging, eliminating the difference in triboelectrification between the old toner and the new toner as much as possible during the toner replenishment is important. In other words, a new toner needs to be replenished without excessively degrading the toner triboelectrification of the old toner. In this embodiment, the triboelectrification of a toner is indirectly detected, and replenishment of a new toner is urged while the toner triboelectrification is not yet excessively low in order to suppress occurrence of replenishment fogging. More specifically, in this embodiment, the current value (developing current) during development of a particular amount of toner is measured to measure the charge amount of the toner, and whether to urge replenishment of a new toner is determined based on the result.

Developing Current

The potential difference between the developing voltage applied to the developing roller 31 and the potential of the exposed portion of the photosensitive drum 1 is typically equal to or less than the discharge threshold. Thus, the current flowing during development is significantly influenced by the movement of charges (toner). Thus, the charge amount of the toner (toner triboelectrification) per unit weight can be predicted by estimating the weight of the toner used in development per unit time. The weight of the toner used in development per unit time can be determined from the weight (hereinafter, referred to as "M/S") of the toner on the developing roller surface per unit area and the area of the toner developed per unit time. The area of the toner developed per unit time is determined from the longitudinal length of the developed toner, in other words, the longitudinal length of an exposed region in the photosensitive drum 1, and the process speed of the image forming apparatus. Thus, by performing a special operation of detecting the developing current, the area of the toner developed per unit time can be kept at a constant value. In other words, in the image forming apparatus used in this embodiment, changes in the M/S of the toner are small, and the M/S is substantially constant. Thus, the current flowing during development can be deemed to be equivalent to the charge amount of the toner per particular weight. Moreover, the controller 101 can calculate the charge amount per unit weight from the charge amount per particular weight. The intensity of exposure is set to a maximum exposure dose that the image forming apparatus can output. In this manner, the triboelectricity of the toner can be accurately measured since all of the toner on the developing roller 31 is developed. Note that when the changes in M/S of the toner are large, the M/S of the toner may be measured with an attached toner amount sensor known in the art and the charge amount of the toner may be determined from the measured result.

Method for Measuring Developing Current

Figure 5:
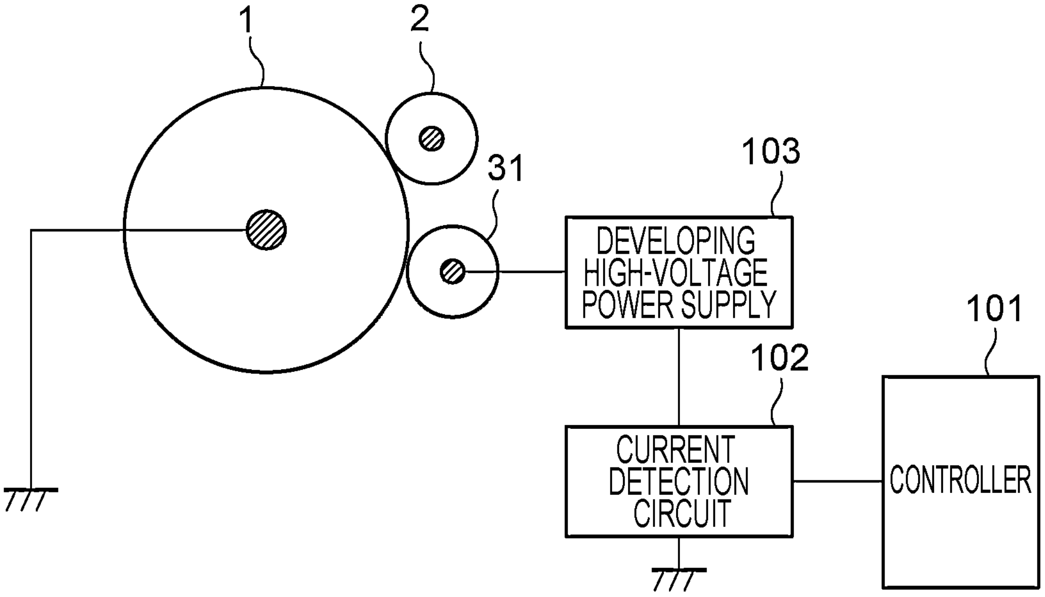
FIG. 5 is a diagram illustrating a developing current detection system according to an embodiment.

FIG. 5 illustrates a detection system that detects an electrical current flowing in the developing roller 31 when a high voltage is applied to the developing roller 31 from a developing high-voltage power supply 103. Referring to the drawing, a current detection circuit 102 detects an electrical current that flows in the developing roller 31, the photosensitive drum 1, and the earth when a developing voltage (for example, −350 V) is applied to the developing roller 31 from the developing high-voltage power supply 103. A signal indicating the current value detected with the current detection circuit 102 is input to the controller 101, and the controller 101 estimates the rough magnitude of the flowing electrical current and detects the electrical current.

The timing of executing the measurement of the developing current can be any; however, in this embodiment, the measurement is executed at the time when the image forming apparatus is installed and then every hundred pages of printing (every particular number of paper sheets that have passed through the apparatus). However, the timing is not limited to this. For example, the developing current may be measured every time the image forming apparatus is activated from the power-off state or the power-save mode.

When the measurement of the developing current is started, the controller 101 first starts driving respective units, such as the photosensitive drum 1, the developing roller 31, and the charge roller 2. Then, at a particular timing, the surface of the photosensitive drum 1 is exposed by the exposing device 4 under the command from the controller 101, the formed electrostatic latent image is developed with the toner, and the developing current is measured. In this embodiment, a range of 216 mm in the longitudinal direction of the photosensitive drum 1 is exposed for one second (this corresponds to the length in the sub-scanning direction of the surface of the photosensitive drum 1) by the exposing device 4, and, when the formed electrostatic latent image has reached the development nip, the controller 101 measures the average current value I during one second on the basis of the input signal.

Determination of Whether or not Toner Replenishment is Needed

According to the study conducted by the inventors, the triboelectrification of the new toner was about −40 [μC/g]. In addition, when replenishment was conducted by adding a new toner to a degraded toner having a toner triboelectrification less than −20 [μC/g] in terms of absolute value, replenishment fogging occurred. In other words, replenishment fogging occurred when the triboelectrification of the new toner was about twice as large as the triboelectrification of the old toner.

Figure 6:
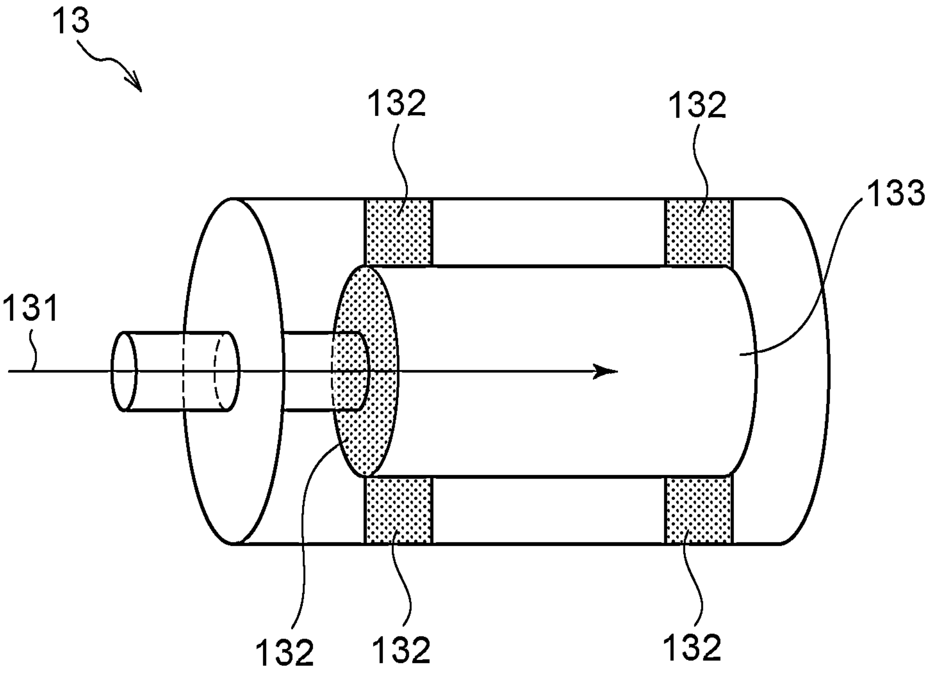
FIG. 6 is a diagram illustrating a structure of a Faraday cage used in one embodiment.

In this embodiment, the toner triboelectrification was measured using a Faraday cage 13 illustrated in a perspective view of FIG. 6. The interior (the right side in the drawing) was put to a depressurized state so as to suction the toner on the developing roller, and the toner was captured by installing a toner filter 133. The Faraday cage 13 also includes a suction portion 131 and holders 132. The mass M of the captured toner and the charge Q directly measured with a Coulomb meter are used to calculate the charge amount per unit mass, Q/M [μC/g]. In this embodiment, a message urging toner replenishment is sent out when it is determined that the toner triboelectrification has become close to one half of the toner triboelectrification of a new toner.

Figure 7:
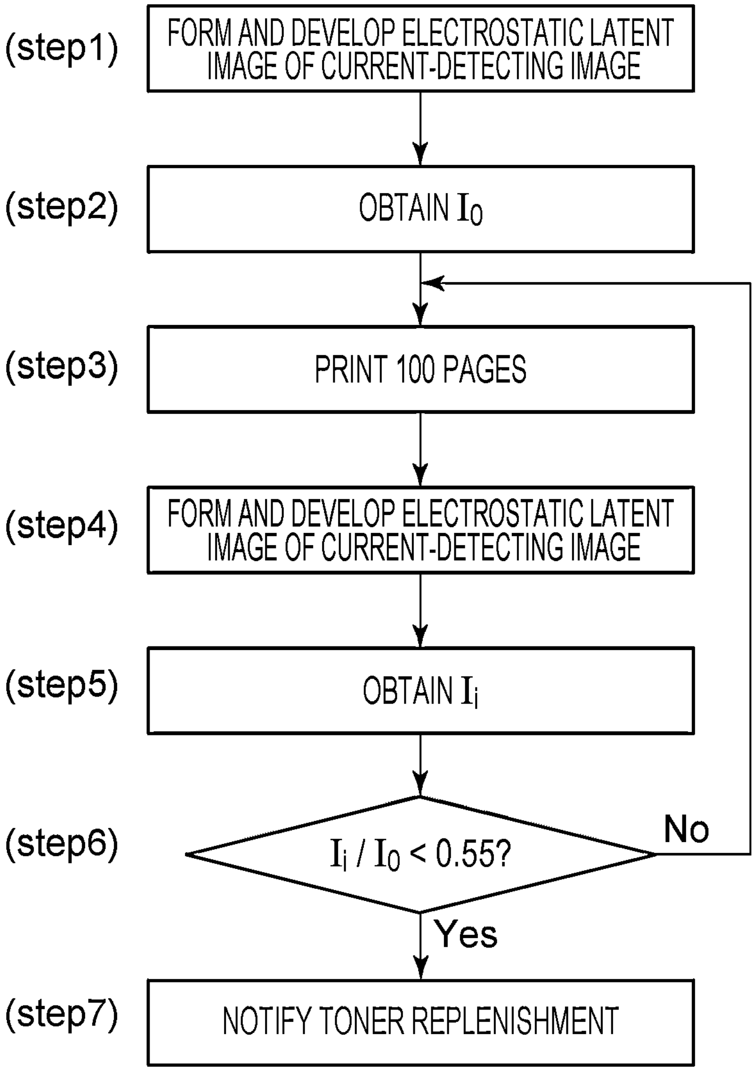
FIG. 7 is a flowchart illustrating how degradation of toner triboelectrification is determined in one embodiment.

In the description below, the operation of the image forming apparatus is described by using a flowchart in FIG. 7.

Step 1

When the image forming apparatus is installed (when the developer is new), the exposing device 4 under a command from the controller 101 forms an electrostatic latent image on the surface of the photosensitive drum 1 charged by the charging roller 2. The size of the electrostatic latent image is 216 mm in the longitudinal direction×1 second of exposure (corresponding to the length in the sub-scanning direction).

Step 2

When the image forming apparatus is installed (when the developer is new), the controller 101 detects a signal from the current detection circuit 102 during one second within which a previous electrostatic latent image is passing through the development nip, measures the developing current, and obtains a developing current $I_0$ that flows when a new toner is used. During the one second, the controller 101 performs sampling of the signal indicating the developing current $I_0$, and the obtained multiple pieces of data are averaged to calculate the developing current $I_0$. The technique for calculating the developing current $I_0$ is not limited to averaging; alternatively, for example, a median value may be obtained from multiple pieces of sampled data, and this median value may be used as the developing current $I_0$. The developing current $I_0$ obtained here is stored in a storage device (not illustrated) of the controller 101. The timing of obtaining the developing current $I_0$ may be any as long as the developing device 3 can be deemed to be in a substantially initial state, for example, the timing may be after completion of printing several tens of sheets.

Steps 3 to 5

Next, the controller 101 measures the developing current again when the controller 101 determines that printing has been performed on 100 pages. In step 4, the same process as in step 1 is performed, and in step 5, the controller 101 obtains a developing current $I_i$. The methods for obtaining and calculating the developing current $I_i$ are the same for those of the developing current $I_0$, and thus, detailed descriptions therefor are omitted.

Step 6

Next, the controller 101 performs the following determinations by calculating the ratio of $I_i$ to $I_0$ on the basis of the detected results.

When $I_i/I_0$ is 0.55 or More

Since the triboelectrification of the toner is sufficiently high, a toner replenishment notification is not sent and the process returns to step 3. The fact that $I_i/I_0$ is 0.55 or more corresponds to the fact that the charge amount of the toner is 55% or more of the charge amount of the toner contained in the developer housing chamber 37 at the initial stage.

When $I_i/I_0$ is Less than 0.55

Since the triboelectrification of the toner is close one half of the triboelectrification of a new toner, the process proceeds to step 7, and a notification urging the toner replenishment is sent out. The fact that $I_i/I_0$ is less than 0.55 corresponds to the fact that the charge amount of the toner is less than 55% of the charge amount of the toner contained in the developer housing chamber 37 at the initial stage. As described in the first embodiment, regarding the toner replenishment notification, examples of the external device to which the controller 101 sends an output that urges toner replenishment via the input output I/F (not illustrated) include a display device, a speaker, and a data transmitter. Examples of the output include a text, an image, and a sound signal.

Exceptional Process

When the optical sensor (not illustrated) detects depletion of the toner before 100 sheets are printed, the developing current is not measured, the process proceeds to step 7, and a toner replenishment notification is sent out.

As described above, according to this embodiment, since the toner triboelectrification can be detected by measuring the developing current, a new toner can be replenished before the toner triboelectrification of the old toner is excessively degraded, and thus occurrence of replenishment fogging can be avoided.

Third Embodiment

The structure of the image forming apparatus of this embodiment is the same as in the first embodiment, and the detailed description therefor is omitted. As is described in the second embodiment, the toner that has been under repeated pressure in the developing portion or the like exhibits degraded chargeability. The image force generated by such a degraded toner (toner with degraded charge properties) is small, and it is difficult for the developing roller 31 to bear such a degraded toner. Even if the degraded toner is retained on the developing roller 31, the degraded toner does not easily electrostatically move onto the photosensitive drum 1, and the new toner having high toner triboelectrification is preferentially used in development and moves onto the photosensitive drum 1. As a result, the degraded toner with degraded chargeability accumulates. In addition, the toner with degraded chargeability is difficult to control by an electrostatic force, thereby readily resulting in background fogging, that is, a phenomenon in which the toner is developed in a background portion (dark potential portion) on the surface of the photosensitive drum 1. Although the degraded toner constituting fogging is discharged to the outside, a majority of the degraded toner accumulates, and, as the toner replenishment is repeated, the amount of the accumulated degraded toner increases. Such a situation should be avoided.

In this embodiment, a developer that suppresses occurrence of the replenishment fogging described in the second embodiment and that can reduce the increase in the amount of the accumulated degraded toner with degraded chargeability is described. An excellent toner replenishing system with further less image defects can be realized by applying the developer described below to the toner replenishing system illustrated in FIGS. 1A and 1B.

Description of Improved Toner

In this embodiment, an improved toner is used to form a developer that can suppress changes in toner triboelectrification caused by printing so as to prevent accumulation of the degraded toner with degraded charging properties and prevent replenishment fogging that occurs during the toner replenishment. More specifically, a toner that includes toner particles that contain a binder resin and a coloring agent is used as the toner. This toner has a Martens hardness of 200 MPa or more and 1100 MPa or less as measured at a maximum load of $2.0\times10^{-4}$ [N]. In this manner, the toner replenishment flowchart illustrated in FIG. 7 in the second embodiment can be executed less frequently or can be made unnecessary. When the flowchart of FIG. 7 is not performed, the controller 101 may perform the toner replenishment notification based on the detected amount of the residual toner described with reference to FIG. 2B.

The technique for adjusting the Martens hardness to 200 MPa or more and 1100 MPa or less as measured at a maximum load of $2.0\times10^{-4}$ N is not particularly limited. However, this hardness is significantly high compared to the hardness of an organic resin used in a typical toner; thus, this level of hardness is difficult to achieve by common techniques employed to increase hardness. For example, it is difficult to achieve this level of harness by a technique involving designing a resin to have a high glass transition temperature, a technique involving increasing the molecular weight of the resin, a technique involving thermal curing, or a technique involving adding a filler to surface layers.

The Martens hardness of an organic resin used in a typical toner is about 50 MPa to 80 MPa as measured at a maximum load of $2.0\times10^{-4}$ N. Even when the hardness is increased by adjusting the resin design, increasing the molecular weight, or the like, the hardness is about 120 MPa or less. Furthermore, even when thermal curing is performed by filling a surface layer and the vicinity thereof with a filler such as a magnetic material or silica, the hardness is about 180 MPa or less. The toner of this embodiment is significantly hard compared to a typical toner.

One of the methods for adjusting the hardness to be within the aforementioned particular hardness range is a method that involves forming a surface layer of a toner with a material, such as an inorganic material, having an appropriate hardness, and then controlling the chemical structure or macrostructure of the surface layer so that the surface layer has an appropriate hardness.

A specific example of a material that can exhibit the aforementioned particular hardness is an organic silicon polymer. The hardness of the organic silicon polymer can be adjusted through the number of carbon atoms directly bonded to the silicon atoms in the organic silicon polymer, the length of the carbon chain, etc. A toner particle may have a surface layer that contains an organic silicon polymer, and the average number of carbon atoms directly bonded to the silicon atoms in the organic silicon polymer may be one or more and three or less per silicon atom since the hardness can be easily adjusted to the aforementioned particular hardness. The number of carbon atoms directly bonded to the silicon atoms in the organic silicon polymer is preferably one or more and two or less per silicon atom, and more preferably one per silicon atom.

Examples of the method for adjusting the Martens hardness by adjusting the chemical structure include adjusting the degree of crosslinking and the degree of polymerization of a surface layer material. Examples of the method for adjusting the Martens hardness by adjusting the macrostructure include adjusting the shapes of irregularities on the surface layer and adjusting the network structure connecting between the protrusions. When an organic silicon polymer is used in the surface layer, such adjustment may be carried out by adjusting the pH, the concentration, the temperature, the time, etc., during pretreatment of the organic silicon polymer. In addition, adjustment can be carried out by adjusting the timing, the form, the concentration, the reaction temperature, etc., at which a surface layer formed of the organic silicon polymer is attached to a core particle of the toner.

The following method may be employed in this embodiment. First, core particles of a toner are prepared, and are dispersed in an aqueous medium to obtain a core particle dispersion liquid. The core particles contain a binder resin and a coloring agent. Dispersing may be conducted at such a concentration that the solid content of the core particles relative to the total amount of the core particle dispersion liquid is 10 mass or more and 40 mass % or less. The temperature of the core particle dispersion liquid may be adjusted to 35° C. or more. The pH of the core particle dispersion liquid may be adjusted to a pH at which condensation of an organic silicon compound is inhibited. The pH at which condensation of the organic silicon polymer is inhibited changes depending on the material, and the pH is preferably adjusted to be within +0.5 of the pH at which condensation is inhibited most. Meanwhile, the organic silicon compound may be hydrolyzed in advance. For example, in a pretreatment of the organic silicon compound, the organic silicon compound is hydrolyzed in a separate container. The feed concentration for the hydrolysis when the amount of the organic silicon compound is 100 parts by mass is preferably 40 parts by mass or more and 500 parts by mass or less and more preferably 100 parts by mass or more and 400 parts by mass or less of water, such as ion exchange water or RO water, from which ionic compounds have been removed. Exemplary conditions of hydrolysis are a pH of 2 to 7, a temperature of 15° C. to 80° C., and a time of 30 to 600 minutes.

The obtained hydrolyzed liquid and the core particle dispersion liquid are mixed, and the pH is adjusted to a value suitable for condensation (preferably 6 to 12 or 1 to 3, and more preferably 8 to 12). As a result, a surface layer can be formed on the core particle surface of the toner while condensating the organic silicon compound. Condensation and attachment of the surface layer may be performed at 35° C. or more for 60 minutes or more. The macrostructure of the surface can be adjusted by adjusting the time of holding a temperature to 35° C. or more before adjusting the pH to a value suitable for condensation; however, in order to obtain the particular Martens hardness easily, the holding time is preferably 3 minutes or more and 120 minutes or less.

Figure 8:
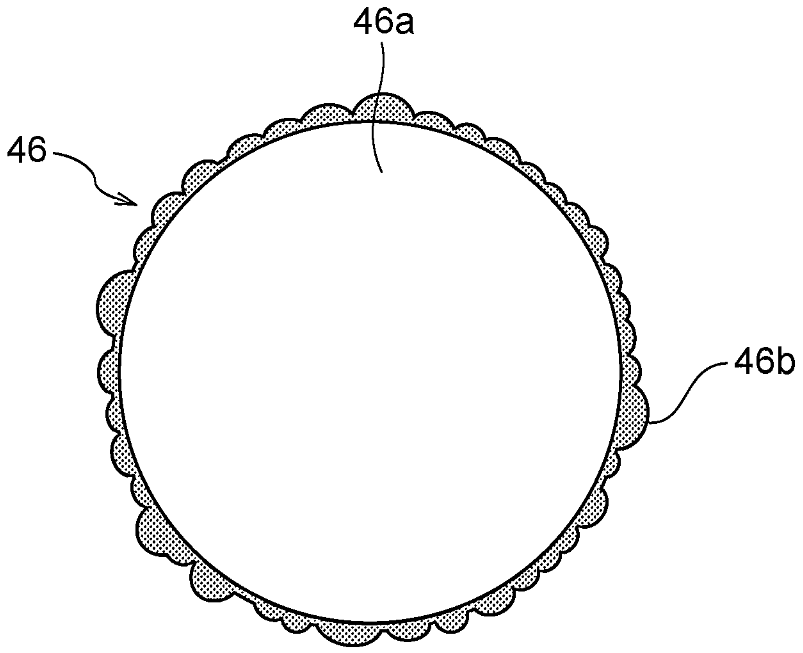
FIG. 8 is a schematic diagram of a toner.

The reaction residues can be decreased and irregularities (凹凸/concavity and convexity) can be formed on the surface layer by the aforementioned method. Moreover, since a network structure can be formed between protrusions, it becomes easy to obtain a toner having the aforementioned particular Martens hardness. The FIG. 8 illustrates example of the toner 46. The surface layer 46*b* covers a toner core particle 46*a*. The surface layer 46*b* has concave-convex shape.

When the surface layer contains an organic silicon polymer, the adhering ratio of the organic silicon polymer is preferably 90% or more and 100% or less. The ratio is more preferably 95% or more. When the adhering ratio is within this range, the change in Martens hardness through endurance and use is small, and the charges can be retained. The method for measuring the adhering ratio of the organic silicon polymer is described below.

Surface Layer

When the toner particle has a surface layer, the surface layer is a layer that covers a toner core particle and exists on the outermost surface of the toner particle. The surface layer containing the organic silicon polymer is significantly harder than typical toner particles. Thus, from the viewpoint of fixability, a portion not provided with the surface layer may be formed in some part of the toner particle surface.

However, the ratio of the number of dividing axes on which the thickness of the surface layer containing the organic silicon polymer is 2.5 nm or less (hereinafter, this ratio may also be referred to as the ratio of the portion of the surface layer having a thickness of 2.5 nm or less) is preferably 20.0% or less. This condition approximates the structure in which at least 80.0% of the surface of a toner particle is formed of a surface layer containing the organic silicon polymer and having a thickness of 2.5 nm or more. In other words, when this conditions is satisfied, the surface layer containing the organic silicon polymer sufficiently covers the core surface. The ratio is more preferably 10.0% or less. The ratio can be measured by cross-sectional observation using a transmission electron microscope (TEM), and details of the measurement are given below.

Surface Layer Containing Organic Silicon Polymer

When a toner particle has a surface layer containing an organic silicon polymer, a substructure represented by formula (1) may be included.

$$R{-}SiO_{3/2} \qquad \text{formula (1)}$$

In formula (1), R represents a hydrocarbon group having 1 to 6 carbon atoms.

In the organic silicon polymer having the structure represented by formula (1), one of the four bonds of a Si atom is bonded to R, and the remaining three are bonded to O atoms. Two bonds of each O atom are both bonded to Si, in other words, a siloxane bond (Si—O—Si) is formed. When Si atoms and O atoms are considered in view of the organic silicon polymer, three O atoms are provided to two Si atoms, and this is thus expressed as $—SiO_{3/2}$. The $—SiO_{3/2}$ structure of the organic silicon polymer is considered to have properties similar to those of silica ($SiO_2$) constituted by many siloxane bonds. Thus, compared to a toner having a surface layer formed by a typical organic resin, this structure is close to an inorganic material, and, presumably thus, it is possible to increase the Martens hardness.

In a chart obtained by $^{29}$Si-NMR measurement of a tetrahydrofuran (THF)-insoluble fraction of the toner particles, the ratio of the peak area of the structure represented by formula (1) relative to the total peak area of the organic silicon polymer is preferably 20% or more. While the details of the measurement method are described below, this approximates the state in which the substructure represented by $R—SiO_{3/2}$ accounts for 20% or more of the organic silicon polymer contained in the toner particles.

As described above, the meaning of the substructure $—SiO_{3/2}$ is that, of the four bonds of a Si atom, three are bonded to oxygen atoms, and these oxygen atoms further bond to different Si atoms. If one of the oxygen atoms forms a silanol group, the substructure of the organic silicon polymer is expressed by $R—SiO_{2/2}—OH$. If two of the oxygen atoms form silanol groups, the substructure of the organic silicon polymer is expressed by $R—SiO_{1/2}(—OH)_2$. Comparing these structures, the structure of the polymer becomes closer to a silica structure represented by $SiO_2$ as more oxygen atoms form crosslinked structures with Si atoms. Thus, as the number of $—SiO_{3/2}$ skeletons increases, the surface free energy of the toner particle surfaces can be decreased, and this provides excellent effects on the environment stability and component contamination resistance.

In addition, the durability achieved by the substructure represented by formula (1) and hydrophobicity and chargeability of R in formula (1) suppress bleeding of an easily bleeding low-molecular-weight (Mw of 1000 or less) resin, a low-Tg (40° C. or less) resin, and, in some cases, a releasing agent that exist on the inner side with respect to the surface layer.

The ratio of the peak area of the substructure represented by formula (1) can be controlled by the type and amount of the organic silicon compound used to form the organic silicon polymer, the reaction temperature, the reaction time, the reaction solvent, and the pH of hydrolysis, addition polymerization, and condensation polymerization performed to form an organic silicon polymer.

In the substructure represented by formula (1), R may be a hydrocarbon group having 1 to 6 carbon atoms. In this manner, the charge amount is easily stabilized. In particular, an aliphatic hydrocarbon group having 1 to 5 carbon atoms or a phenyl group are preferable for their excellent environmental stability.

In this embodiment, R is more preferably a hydrocarbon group having 1 to 3 carbon atoms in order to further improve chargeability and suppress fogging. When chargeability is excellent, the transferability is excellent, and the amount of transfer residual toner is small; thus, contamination of the drum, the charging member, and the transfer member is reduced. Examples of the aliphatic hydrocarbon group having 1 to 3 carbon atoms include a methyl group, an ethyl group, a propyl group, and a vinyl group. From the viewpoints of the environmental stability and storage stability, R is preferably a methyl group.

An example of the method for producing the organic silicon polymer is a sol-gel method. A sol-gel method involves hydrolyzing and condensation-polymerizing a liquid raw material serving as a starting material to prepare a sol and then gelling the resulting sol, and is used to synthesize glass, ceramics, organic-inorganic hybrids, and nanocomposites. According to this method, functional materials of various forms, such as a surface layer, fibers, a bulk material, and microparticles, can be produced from a liquid phase at a low temperature.

The organic silicon polymer present in the surface layer of the toner particle may be generated by hydrolysis and condensation polymerization of a silicon compound, specifically, alkoxysilane.

The environmental stability is improved by forming a surface layer containing the organic silicon polymer in the toner particle, and thus a toner that does not undergo degradation of the toner performance in long-term use and has excellent storage stability can be obtained.

Moreover, since the sol-gel method starts with a liquid and forms a material by gelling the liquid, various fine structures and shapes can be formed. In particular, when toner particles are formed in an aqueous medium, it is easier to have the organic silicon compound precipitate on the surface of the toner particle due to the hydrophilic property provided by hydrophilic groups such as silanol groups. The aforementioned fine structures and shapes can be adjusted by adjusting the reaction temperature, the reaction time, the reaction solvent, the pH, the type and amount of the organic silicon compound, etc.

The organic silicon polymer in the surface layer of the toner particle may be a polycondensation product of an organic silicon compound having a structure represented by formula (Z) below.

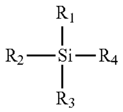

(Z)

In formula (Z), $R_1$ represents a hydrocarbon group having 1 to 6 carbon atoms, and $R_2$, $R_3$, and $R_4$ each independently represent a halogen atom, a hydroxy group, an acetoxy group, or an alkoxy group.

The hydrocarbon group (for example, an alkyl group) represented by $R_1$ can improve hydrophobicity, and toner particles with excellent environmental stability can be obtained. An aryl group, which is an aromatic hydrocarbon group, can also be used as the hydrocarbon group. For example, a phenyl group can be used. When the hydrophobicity of $R_1$ is high, changes in charge amount tend to increase in various environments. From the viewpoint of environmental stability, $R_1$ preferably represents an aliphatic hydrocarbon group having 1 to 3 carbon atoms, and more preferably represents a methyl group. $R_2$, $R_3$, and $R_4$ each independently represent a halogen atom, a hydroxy group, an acetoxy group, or an alkoxy group (hereinafter may also be referred to as a "reactive group"). These reactive groups form a crosslinked structure through hydrolysis, addition polymerization, and polycondensation, and thus a toner having excellent component contamination resistance and development durability can be obtained. An alkoxy group having 1 to 3 carbon atoms is preferable and a methoxy group or an ethoxy group is more preferable from the viewpoints of mild hydrolyzability at room temperature and the abilities to precipitate on and cover the surface of the toner particles. Hydrolysis, addition polymerization, and condensation polymerization of $R_2$, $R_3$, and Ry can be controlled through the reaction temperature, the reaction time, the reaction solvent, and the pH. In order to obtain the organic silicon polymer used in the this embodiment, an organic silicon compound having, within one molecule, three reactive groups ($R_2$, $R_3$, and $R_4$) other than $R_1$ in formula (Z) described above may be used (hereinafter this compound may also be referred to as a trifunctional silane). One trifunctional silane may be used or two or more trifunctional silanes may be used in combination.

Examples of the compound represented by formula (Z) above are as follows.

Trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, and methyldiethoxyhydroxysilane.

Trifunctional silanes such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, and hexyltrihydroxysilane.

Trifunctional phenylsilanes such as phenyltrimethoxysilane, phenyltriethoxysilane, phenyltrichlorosilane, phenyltriacetoxysilane, and phenyltrihydroxysilane.

As long as the effects of this embodiment are not impaired, an organic silicon polymer obtained by using the following material in combination with the organic silicon compound having a structure represented by formula (Z) may be used. Organic silicon compounds (tetrafunctional silanes) having four reactive groups in one molecule, organic silicon compounds (difunctional silanes) having two reactive groups in one molecule, and organic silicon compounds (monofunctional silanes) having one reactive group in one molecule. Examples thereof are as follows.

Trifunctional vinylsilanes such as dimethyldiethoxysilane, tetraethoxysilane, hexamethyldisilazane, 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, vinyltriisocyanatesilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane.

The organic silicon polymer content in the toner particles may be 0.5 mass % or more and 10.5 mass % or less.

When the organic silicon polymer content is 0.5 mass % or more, the surface free energy of the surface layers can be further decreased, the flowability is improved, and the component contamination and fogging can be suppressed. When the content is 10.5 mass % or less, charge-up can be suppressed. The organic silicon polymer content can be controlled through the type and amount of the organic silicon compound used to form the organic silicon polymer, and the method for producing toner particles, the reaction temperature, the reaction time, the reaction solvent, and the pH during formation of the organic silicon polymer.

A surface layer containing the organic silicon polymer may be in contact with a toner core particle without any gap. In this manner, bleeding of resin components, a releasing agent, etc., that are present on the inner side with respect to the surface layer of the toner particle can be suppressed, and a toner having excellent storage stability, environmental stability, and development durability can be obtained. The surface layer may contain, in addition to the organic silicon polymer described above, a resin such as a styrene-acryl copolymer resin, a polyester resin, or a urethane resin, various additives, etc.

Binder Resin

The toner particles contain a binder resin. The binder resin may be any known binder resin. The binder resin is preferably a vinyl resin, a polyester resin, or the like. Examples of the vinyl resin, the polyester resin, and other binder resins include the following resins and polymers.

Homopolymers of styrene and substituted styrenes such as polystyrene and polyvinyltoluene; styrene copolymers such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer; and polymethyl methacrylate, polybutyl methacrylate, polyvinyl acetate, polyethylene, polypropylene, polyvinyl butyral, a silicone resin, a polyamide resin, an epoxy resin, a polyacrylic resin, rosin, modified rosin, a terpene resin, a phenolic resin, an aliphatic or alicyclic hydrocarbon resin, and an aromatic petroleum resin. These binder resins may be used alone or in combination.

From the viewpoint of chargeability, the binder resin may contain a carboxy group, and may be a resin produced by using a polymerizable monomer containing a carboxy group. Examples thereof include acrylic acid; derivatives of α-alkyl unsaturated carboxylic acids and derivatives of β-alkyl unsaturated carboxylic acids such as methacrylic acid, α-ethylacrylic acid, and crotonic acid; unsaturated dicarboxylic acids such as fumaric acid, maleic acid, citraconic acid, and itaconic acid; and unsaturated dicarboxylic acid monoester derivatives such as succinic acid monoacryloyloxyethyl ester, succinic acid monoacryloyloxyethylene ester, phthalic acid monoacryloyloxyethyl ester, and phthalic acid monomethacryloyloxyethyl ester.

The polyester resin can be a polyester resin obtained by polycondensation of a carboxylic acid component and an alcohol component, examples of which are described below. Examples of the carboxylic acid component include terephthalic acid, isophthalic acid, phthalic acid, fumaric acid, maleic acid, cyclohexanedicarboxylic acid, and trimellitic acid. Examples of the alcohol component include bisphenol A, hydrogenated bisphenol, bisphenol A ethylene oxide adduct, bisphenol A propylene oxide adduct, glycerin, trimethylolpropane, and pentaerythritol.

The polyester resin may be a polyester resin having a urea group. The terminal carboxyl group of the polyester resin may be uncapped.

The binder resin may have a polymerizable functional group in order to address changes in viscosity of the toner that occur at high temperatures. Examples of the polymerizable functional group include a vinyl group, an isocyanate group, an epoxy group, an amino group, a carboxy group, and a hydroxy group.

Crosslinking Agent

In order to control the molecular weight of the binder resin, a crosslinking agent may be added during polymerization of the polymerizable monomer.

Examples of the crosslinking agent include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, polyester-type diacrylate (MANDA by Nippon Kayaku), and any of the foregoing compounds with acrylate substituted by methacrylate.

The amount of the added crosslinking agent relative to 100 parts by mass of the polymerizable monomer may be 0.001 parts by mass or more and 15.000 parts by mass or less.

Releasing Agent

The toner particles may contain a releasing agent. Examples of the releasing agent that can be used in the toner particles include petroleum wax and derivatives thereof such as paraffin wax, microcrystalline wax, and petrolatum, Montan wax and derivatives thereof, hydrocarbon wax obtained by the Fischer-Tropsch process and derivatives thereof, polyolefin wax and derivatives thereof such as polyethylene and polypropylene, natural wax and derivatives thereof such as carnauba wax and candelilla wax, higher fatty alcohols, fatty acids such as stearic acid and palmitic acid, and acid amides, esters, and ketones thereof, hydrogenated castor oil and derivatives thereof, vegetable wax, animal wax, and silicone resins. Note that derivatives include oxides, block copolymers with vinyl monomers, and graft modified products.

The releasing agent content relative to 100.0 parts by mass of the binder resin or the polymerizable monomer may be 5.0 parts by mass or more and 20.0 parts by mass or less.

Coloring Agent

The toner particles contain a coloring agent. The coloring agent can be any known coloring agent, and examples thereof are as follows.

Examples of black pigments include carbon black, aniline black, nonmagnetic ferrite, magnetite, and pigments toned to black by using yellow coloring agents, red coloring agents, and blue coloring agents described below. These coloring agents can be used alone or as a mixture of two or more, or can be used in a solid solution form.

Examples of the coloring agents of other colors are as follows. Examples of the yellow pigment include condensed azo compounds such as yellow iron oxide, Naples Yellow, Naphthol Yellow S, Hansa Yellow G, Hansa Yellow 10G, Benzidine Yellow G, Benzidine Yellow GR, Quinoline Yellow Lake, Permanent Yellow NCG, and Tartrazine Lake, isoindolinone compounds, anthraquinone compounds, azo metal complexes, methine compounds, and allylamide compounds. Specific examples are as follows.

C.I. Pigment Yellow 12, 13, 14, 15, 17, 62, 74, 83, 93, 94, 95, 109, 110, 111, 128, 129, 147, 155, 168, and 180.

Examples of the orange pigment are as follows. Permanent Orange GTR, Pyrazolone Orange, Vulcan Orange, Benzidine Orange G, Indanthren Brilliant Orange RK, and Indanthrene Brilliant Orange GK.

Examples of the red pigment include condensed azo compounds such as Bengala, Permanent Red 4R, Lithol Red, Pyrazolone Red, Watchung Red Calcium Salt, Lake Red C, Lake Red D, Brilliant Carmine 6B, Brilliant Carmine 3B, Eosin Lake, Rhodamine Lake B, and Alizarin Lake, diketopyrrolopyrrole compounds, anthraquinone compounds, quinacridone compounds, basic dye lake compounds, naphthol compounds, benzimidazolone compounds, thioindigo compounds, and perylene compounds. Specific examples are as follows.

C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

Examples of the blue pigment include copper phthalocyanine compounds and derivatives thereof such as Alkali Blue Lake, Victoria Blue Lake, Phthalocyanine Blue, metal-free Phthalocyanine Blue, Phthalocyanine Blue partial chloride, Fast Sky Blue, and Indanthrene Blue BG, anthraquinone compounds, and basic dye lake compounds. Specific examples are as follows.

C. I. Pigment Blue 1, 7, 15, 15:1, 15:2, 15:3, 15:4, 60, 62, and 66.

Examples of the purple pigment include Fast Violet B and Methyl Violet Lake.

Examples of the green pigment include Pigment Green B, Malachite Green Lake, and Final Yellow Green G. Examples of the white pigment include zinc white, titanium oxide, antimony white, and zinc sulfide.

If necessary, the coloring agent may be surface-treated with a material that does not obstruct polymerization.

The coloring agent content relative to 100.0 parts by mass of the binder resin or the polymerizable monomer can be 3.0 parts by mass or more and 15.0 parts by mass or less.

Method for Producing Toner Particles

A known method may be used to produce toner particles, and examples include a kneading and pulverizing method and a wet method. From the viewpoints of uniform particle diameters and shape controllability, the wet method can be used. Examples of the wet method include a suspension polymerization method, a dissolution and suspension method, an emulsion polymerization and aggregation method, and an emulsion and aggregation method.

Here, the suspension polymerization method is described. First, a polymerizable monomer composition is prepared by homogeneously dissolving or dispersing a polymerizable monomer for generating the binder resin, a coloring agent, and, if needed, other additives by using a disperser such as a ball mill or an ultrasonic disperser (polymerizable monomer composition preparation step). At this stage, if needed, a polyfunctional monomer, a chain transfer agent, wax serving as a releasing agent, a charge controller, a plasticizer, and the like may be added as appropriate. Examples of the polymerizable monomer used in the suspension polymerization method are the following vinyl-based polymerizable monomers.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecyl styrene, p-methyoxystyrene, and p-phenylstyrene; acryl-based polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacryl-based polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl benzoate, vinyl butyrate, and vinyl formate; vinyl ethers such as vinyl methyl ether, vinyl ethyl ether, and vinyl isobutyl ether; and vinyl methyl ketone, vinyl hexyl ketone, and vinyl isopropyl ketone.

Next, the polymerizable monomer composition is put into an aqueous medium prepared in advance, and droplets formed of the polymerizable monomer composition are formed into the desired size of toner particles by using a high-shear-force stirrer or disperser (particle forming step).

The aqueous medium in the particle forming step may contain a dispersion stabilizer in order to control the particle diameter of the toner particles, obtain a sharp particle size distribution, and suppress uniting of the toner particles in the production process. The dispersion stabilizer is generally roughly categorized into a polymer that exhibits a repelling force through steric hindrance and a sparingly water-soluble inorganic compound that stabilizes the dispersion through an electrostatic repelling force. Fine particles of a sparingly water-soluble inorganic compound dissolve in an acid or an alkali, and thus can be easily dissolved and removed by washing with an acid or an alkali after polymerization.

The sparingly water-soluble inorganic compound that serves as the dispersion stabilizer may contain magnesium, calcium, barium, zinc, aluminum, or phosphorus. The sparingly water-soluble inorganic compound that serves as the dispersion stabilizer more preferably contains magnesium, calcium, aluminum, or phosphorus. Specific examples are as follows.

Magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite. The dispersion stabilizer described above may be used in combination with an organic compound, such as polyvinyl alcohol, gelatin, methyl cellulose, methyl hydroxypropyl cellulose, ethyl cellulose, carboxymethyl cellulose sodium salt, or starch. Relative to 100 parts by mass of the polymerizable monomer, 0.01 parts by mass or more and 2.00 parts by mass or less of these dispersion stabilizers may be used.

Relative to 100 parts by mass of the polymerizable monomer, 0.001 parts by mass or more and 0.1 parts by mass or less of a surfactant may be used in combination in order to make these dispersion stabilizers finer. Examples of the surfactant include commercially available nonionic, anionic, and cationic surfactants. Specific examples thereof include sodium dodecyl sulfate, sodium tetradecyl sulfate, sodium pentadecyl sulfate, sodium octyl sulfate, sodium oleate, sodium laurate, potassium stearate, and calcium oleate.

After or during the particle forming step, the temperature may be set to 50° C. or more and 90° C. or less, and the polymerizable monomer contained in the polymerizable monomer composition is polymerized to obtain a toner participle dispersion liquid (polymerization step).

In the polymerization step, the interior of the container may be stirred so that the temperature distribution becomes even. When a polymerization initiator is to be added, the timing and the length of time of addition may be any. In order to obtain a desired molecular weight distribution, the temperature may be elevated during the latter stage of the polymerization reaction. Moreover, in order to remove the unreacted polymerizable monomer, by-products, etc., to the outside of the system, the aqueous medium may be partly distilled away during the latter stage of the reaction or after completion of the reaction. The distillation may be performed at a normal pressure or a reduced pressure.

The polymerization initiator used in the suspension polymerization method is typically an oil-soluble initiator. Examples thereof are as follows.

Azo compounds such as 2,2'-azobisisobutyronitrile, 2,2'-azobis-2,4-dimethylvaleronitrile, 1,1'-azobis(cyclohexane-1-carbonitrile), and 2,2'-azobis-4-methoxy-2,4-dimethylvaleronitrile; and peroxide-based initiators such as acetylcyclohexylsulfonyl peroxide, diisopropylperoxycarbonate, decanoyl peroxide, lauroyl peroxide, stearoyl peroxide, propionyl peroxide, acetyl peroxide, tert-butylperoxy-2-ethylhexanoate, benzoyl peroxide, tert-butylperoxy isobutyrate, cyclohexanone peroxide, methyl ethyl ketone peroxide, dicumyl peroxide, tert-butyl hydroperoxide, di-tert-butyl peroxide, tert-butyl peroxide pivalate, and cumene hydroperoxide.

If necessary, a water-soluble initiator can be used in combination as the polymerization initiator, and examples thereof are as follows. Ammonium persulfate, potassium persulfate, 2,2'-azobis(N, N'-dimethyleneisobutyroamidine) hydrochloride, 2,2'-azobis(2-amidinopropane) hydrochloride, azobis(isobutylamidine) hydrochloride, sodium 2,2'-azobisisobutyronitrile sulfonate, ferrous sulfate, and hydrogen peroxide.

These polymerization initiators can be used alone or in combination. In order to control the degree of polymerization of the polymerizable monomer, a chain transfer agent, a polymerization inhibitor, and the like may be additionally used.

From the viewpoint of obtaining a high-precision, high-resolution image, the weight-average particle diameter of the toner particles may be 3.0 μm or more and 10.0 μm or less. The weight-average particle diameter of the toner can be measured by an aperture-format electrical resistance method. For example, Coulter Counter Multisizer 3 (produced by Beckman Coulter Inc.) can be used for the measurement. The toner particle dispersion liquid obtained as such is then sent to a filtering step to perform solid-liquid separation of the toner particles and the aqueous medium.

The solid-liquid separation for obtaining the toner particles from the obtained toner particle dispersion liquid can be performed by a typical filtration method, and, subsequently, the toner particles may again be formed into slurry or may be rinsed with rinsing water to remove remaining foreign matters from the toner particle surfaces. After thorough washing, solid-liquid separation is performed again to obtain a toner cake. The toner cake is then dried by a known drying method, and, if needed, a particle group having a particle diameter outside the particular range is separated by classification to obtain toner particles. The particle group having a particle diameter outside the particular range may be re-used to improve the ultimate yield.

When a surface layer containing an organic silicon polymer is to be formed by forming toner particles in an aqueous medium, as described above, the surface layer can be formed by adding a hydrolyzed liquid of the organic silicon compound while performing the polymerization step and other appropriate steps in the aqueous medium. The dispersion liquid of the toner particles after polymerization may be used as a core particle dispersion liquid, and a hydrolyzed liquid of an organic silicon compound may be added thereto to form surface layers. When an aqueous medium is not used, such as when a kneading and pulverizing method is employed, the obtained toner particles can be dispersed in an aqueous medium to prepare a core particle dispersion liquid, and a hydrolyzed liquid of the organic silicon compound may be added thereto to form the surface layers.

Method for Measuring Physical Properties of Toner

Method for Separating THF Insoluble Fraction of Toner Particles for NMR Measurement The tetrahydrofuran (THF) insoluble fraction of the toner particles can be obtained as follows.

First, 10.0 g of the toner particles are weighed, placed in a cylindrical filter (No. 86R produced by Toyo Roshi Kaisha, Ltd.), and set in a Soxhlet extractor. Extraction is performed for 20 hours using 200 mL of THF as a solvent, and the residue in the cylindrical filter is vacuum dried at 40° C. for several hours. The resulting product is used as the THF insoluble fraction of the toner particles for NMR measurement.

When the surfaces of the toner particles have been treated with an external additive or the like, the external additive is removed by the following method to obtain toner particles.

To 100 mL of ion exchange water, 160 g of sucrose (produced by Kishida Chemical Co., Ltd.) is added and dissolved on a hot water bath to prepare a sucrose heavy solution. Into a tube (volume: 50 mL) for centrifugal separation, 31 g of the sucrose heavy solution and 6 mL Contaminon N (produced by Wako Pure Chemical Corporation, a 10 mass % aqueous solution of a neutral detergent for washing precision measurement instruments, the detergent having a pH of 7 and containing a nonionic surfactant, an anionic surfactant, and an organic builder) are placed, and a dispersion liquid is prepared. To this dispersion liquid, 1.0 g of the toner is added, and toner lumps are loosened with a spatula or the like.

The tube for centrifugal separation is shaken for 20 minutes with a shaker at 350 spm (strokes per minute). After shaking, the liquid is placed in a glass tube (volume: 50 mL) for a swing rotor, and separated at 3500 rpm for 30 minutes with a centrifugal separator (H-9R produced by Kokusan Co., Ltd.). As a result, the toner particles and the detached external additive separate from each other. After visually confirming that the toner is sufficiently separated from the aqueous solution, the toner that has separated to form the top layer is sampled with a spatula or the like. The sampled toner is filtered through a vacuum filter and dried in a drier for 1 hour or more to obtain toner particles. This process is performed several times to secure the required amount.

Method for Confirming Substructure Represented by Formula (1)

The following method is employed to confirm the substructure represented by formula (1) in the organic silicon polymer contained in the toner particles.

The hydrocarbon group represented by R in formula (1) is confirmed by $^{13}$C-NMR. [Measurement conditions of $^{13}$C-NMR (solid)]

Instrument: JNM-ECX500II produced by JEOL RESONANCE Inc.

Sample tube: 3.2 mm in diameter

Sample: tetrahydrofuran insoluble fraction of toner particles for NMR measurement, 150 mg Measurement temperature: room temperature Pulse mode: CP/MAS Measurement nucleus frequency: 123.25 MHZ ($^{13}$C)

Standard substance: adamantane (external standard: 29.5 ppm)

Sample rotation rate: 20 kHz

Contact time: 2 ms

Delay time: 2 s

Number of runs: 1024

This method is used to identify the hydrocarbon group represented by R in formula (1) on the basis of whether there is a signal derived from a group bonded to a silicon atom, such as a methyl group ($Si—CH_3$), an ethyl group ($Si—C_2H_5$), a propyl group ($Si—C_3H_7$), a butyl group ($Si—C_4H_9$), a pentyl group ($Si—C_5H_{11}$), a hexyl group ($Si—C_6H_{13}$), or a phenyl group ($Si—C_6H_5$).

Method for Calculating the Ratio of the Peak Area Attributable to the Structure Represented by Formula (1) in the Organic Silicon Polymer Contained in the Toner Particles The $^{29}$Si-NMR (solid) measurement of the THF insoluble fraction of the toner particles is conducted under the following conditions.

Measurement Conditions of $^{29}$Si-NMR (Solid)

Instrument: JNM-ECX500II produced by JEOL RESONANCE Inc.
Sample tube: 3.2 mm in diameter
Sample: tetrahydrofuran insoluble fraction of toner particles for NMR measurement, 150 mg
Measurement temperature: room temperature
Pulse mode: CP/MAS
Measurement nucleus frequency: 97.38 MHZ ($^{29}$Si)
Standard substance: DSS (external standard: 1.534 ppm)
Sample rotation rate: 10 kHz
Contact time: 10 ms
Delay time: 2 s
Number of runs: 2000 to 8000

After the measurement described above, the peaks of multiple silane components with different substituents and bonding groups in the tetrahydrofuran insoluble fraction of the toner particles are separated, by curve fitting, into the X1 structure, X2 structure, X3 structure, and X4 structure described below, and the peak area of each structure is calculated.

X1 structure: $(Ri)(Rj)(Rk)SiO_{1/2}$ Formula (2)

X2 structure: $(Rg)(Rh)Si(O_{1/2})_2$ formula (3)

X3 structure: $RmSi(O_{1/2})_3$ formula (4)

X4 structure: $Si(O_{1/2})_4$ formula (5)

X1 structure (2)

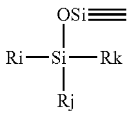

X2 structure (3)

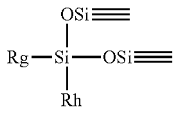

X3 structure (4)

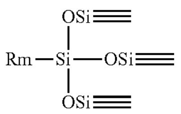

X4 structure (5)

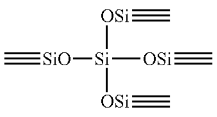

In formulae (2), (3), and (4), Ri, Rj, Rk, Rg, Rh, and Rm each independently represent an organic group, such as a hydrocarbon group having 1 to 6 carbon atoms, a halogen atom, a hydroxy group, an acetoxy group, or an alkoxy group bonded to silicon.

In this embodiment, in a chart obtained by $^{29}$Si-NMR measurement of the THF-insoluble fraction of the toner particles, the ratio of the peak area attributable to the structure represented by formula (1) relative to the total peak area of the organic silicon polymer may be 20% or more. When the substructure represented by formula (1) needs to be confirmed in further detail, identification may be carried out by using the measurement results of 1H-NMR in addition to the measurement results of $^{13}$C-NMR and $^{29}$Si-NMR described above.

Method for Measuring the Ratio of the Portion where the Thickness of the Surface Layer Containing the Organic Silicon Polymer is 2.5 nm or Less as Measured by a Cross-Sectional Observation of the Toner Particles with a Transmission Electron Microscope (TEM)

In this embodiment, cross-sectional observation of the toner particles is conducted by the following method.

A specific method for observing cross sections of toner particles involves thoroughly dispersing toner particles in a room temperature-curable epoxy resin and curing the resin for 2 days in a 40° C. atmosphere. A thin strip of a sample is cut out from the obtained cured product with a microtome equipped with a diamond blade. Cross sections of toner particles in this sample are observed with a transmission electron microscope (TEM) (JEM-2800 produced by JEOL Ltd.) at a magnification of 10,000× to 100,000×.

Since there is a difference in atomic weight between the binder resin and the surface layer material and a portion with a large atomic weight appears in lighter shade, identification can be carried out. In order to enhance the contrast between materials, a ruthenium tetroxide staining method or an osmium tetroxide staining method is employed.

An equivalent circle diameter Dtem of each articles used in the measurement determined from cross sections of the toner particles in the aforementioned TEM image is to be within the range of +10% of the weight-average particle diameter D4 of the toner particles determined by the method described below.

As described above, a dark field image of toner particle cross sections is obtained by using JEM-2800 produced by JEOL Ltd., at an acceleration voltage of 200 kV. Next, mapping image is obtained by a three window method using an EELS detector, GIF Quantam produced by Gatan, Inc., to confirm surface layers.

For each toner particle having an equivalent circle diameter Dtem within the range of +10% of the weight-average particle diameter D4 of the toner particles, the toner particle cross section is equally divided into sixteen parts with respect to the intersection between the long axis L of the toner particle cross section and an axis L90 that passes through the center of the long axis L and is perpendicular to the long axis L. Dividing axes each extending from the aforementioned center to the surface layer are to be represented by An (n=1 to 32) each, the length of each dividing axis is to be represented by RAn, and the thickness of the surface layer is to be represented by FRAn.

The number of the dividing axes on which the thickness of the surface layer containing the organic silicon polymer is 2.5 nm or less is counted and the ratio of these axes relative to the thirty-two dividing axes is determined. Ten toner particles are measured, and the average per toner particle is calculated.

Equivalent Circle Diameter Dtem Determined from the Cross Sections of Toner Particles Obtained from a Transmission Electron Microscope (TEM) Image The equivalent circle diameter Dtem determined from the cross sections of toner particles obtained from a TEM image is determined by the following method. First, for one toner particle, the equivalent circle diameter Dtem determined from the cross section of that toner particle obtained from the TEM image is determined from the following formula.

Equivalent Circle Diameter (Dtem) Obtained from a Cross Section of a Toner Particle Obtained from a TEM Image=(RA1+RA2+RA3+RA4+RA5+RA6+RA7+RA8+RA9+RA10+RA11+RA12+RA13+RA14+RA15+RA16+RA17+RA18+RA19+RA20+RA21+RA22+RA23+RA24+RA25+RA26+RA27+RA28+RA29+RA30+RA31+RA32)/16

The equivalent circle diameters of ten toner particles are determined and averaged to determine the equivalent circle diameter (Dtem) determined from the cross sections of the toner particles.

Ratio of Portions where the Surface Layer Containing Organic Silicon Polymer has a Thickness of 2.5 nm or Less Ratio of portions where the surface layer containing organic silicon polymer has a thickness (FRAn) of 2.5 nm or less={(number of axes on which the thickness (FRAn) of the surface layer containing the organic silicon polymer is 2.5 nm or less)/32}×100

This calculation is conducted for ten toner particles, and the ratios of portions where the surface layer containing organic silicon polymer has a thickness (FRAn) of 2.5 nm or less are averaged, and the result is used as the ratio of portions where the surface layer containing organic silicon polymer has a thickness (FRAn) of 2.5 nm or less.

Measurement of Organic Silicon Polymer Content in Toner Particles

The organic silicon polymer content is measured by using a wavelength dispersive X-ray fluorescence spectrometer "Axios" (produced by PANalytical) and packaged special software "SuperQ ver. 4.0F" (produced by PANalytical) for setting measurement conditions and analyzing the measurement data. Rh is used as the anode of the X-ray tube, the measurement atmosphere is vacuum, the measurement diameter (collimator mask diameter) is 27 mm, and the measurement time is 10 seconds. When light elements are to be measured, a proportional counter (PC) is used for detection, and when heavy elements are to be measured, a scintillation counter (SC) is used for detection.

The measurement sample is a pellet formed by placing 4 g of toner particles in a special aluminum ring for pressing, leveling the particles flat, and pressurizing the particles at 20 MPa for 60 seconds by using a tablet compressor "BRE-32" (produced by Maekawa Testing Machine MFG. Co., Ltd.) so as to form a pellet having a thickness of 2 mm and a diameter of 39 mm.

Relative to 100 parts by mass of the toner particles not containing an organic silicon polymer, 0.5 parts by mass of a silica ($SiO_2$) fine powder is added, and the resulting mixture is thoroughly mixed in a coffee mill. Similarly, relative to 100 parts by mass of the toner particles, 5.0 parts by mass of the silica fine powder and 10.0 parts by mass of the silica fine powder are respectively mixed to a calibration curve sample.

For each of the samples, a pellet of a calibration curve sample is prepared as described above using the tablet compressor, and the counting rate (unit: cps) of the Si—K α radiation observed at a diffraction angle (2θ) of 109.08° is measured with PET as the dispersive crystal. During this process, the acceleration voltage and the current value of the X-ray generator are, respectively, 24 kV and 100 mA. A calibration curve of a linear function is obtained by plotting the obtained X-ray counting rate on the vertical axis and the amount of added $SiO_2$ in each calibration curve sample on the horizontal axis. Next, the toner particles to be analyzed are formed into a pellet by using a tablet compressor as described above, and the counting rate of the Si—K α radiation is measured. The organic silicon polymer content in the toner particles is then determined from the aforementioned calibration curve.

Method for Measuring Adhering Ratio of the Organic Silicon Polymer

To 100 mL of ion exchange water, 160 g of sucrose (produced by Kishida Chemical Co., Ltd.) is added and dissolved on a hot water bath to prepare a sucrose heavy solution. Into a tube (volume: 50 mL) for centrifugal separation, 31 g of the sucrose heavy solution and 6 mL Contaminon N (produced by Wako Pure Chemical Corporation, a 10 mass % aqueous solution of a neutral detergent for washing precision measurement instruments, the detergent having a pH of 7 and containing a nonionic surfactant, an anionic surfactant, and an organic builder) are placed, and a dispersion liquid is prepared. To this dispersion liquid, 1.0 g of the toner is added, and toner lumps are loosened with a spatula or the like.

The tube for centrifugal separation is shaken for 20 minutes with a shaker at 350 spm (strokes per minute). After shaking, the liquid is placed in a glass tube (volume: 50 mL) for a swing rotor, and separated at 3500 rpm for 30 minutes with a centrifugal separator (H-9R produced by Kokusan Co., Ltd.). After visually confirming that the toner is sufficiently separated from the aqueous solution, the toner that has separated to form the top layer is sampled with a spatula or the like. The sampled aqueous solution containing the toner is filtered through a vacuum filter and dried in a drier for 1 hour or more. The dried product is disintegrated with a spatula, and the Si content is measured with an X-ray fluorescence. The adhering ratio (%) is calculated from the ratio of the target element amount of the washed toner to that of the initial toner.

The X-ray fluorescence of each element is measured in accordance with JIS K 0119-1969, and specific details are as follows.

As the measuring instrument, a wavelength dispersive X-ray fluorescence spectrometer "Axios" (produced by PANalytical) and packaged special software "SuperQ ver. 4.0F" (produced by PANalytical) for setting measurement conditions and analyzing the measurement data are used. Rh is used as the anode of the X-ray tube, the measurement atmosphere is vacuum, the measurement diameter (collimator mask diameter) is 10 mm, and the measurement time is 10 seconds. When light elements are to be measured, a proportional counter (PC) is used for detection, and when heavy elements are to be measured, a scintillation counter (SC) is used for detection.

The measurement sample is a pellet having a thickness of about 2 mm formed by placing about 1 g of an initial toner and a water-washed toner in a special 10 mm-diameter aluminum ring for pressing, leveling the toners flat, and pressurizing the toners at 20 MPa for 60 seconds by using a tablet compressor. "BRE-32" (produced by Maekawa Testing Machine MFG. Co., Ltd.) is used as the tablet compressor.

Measurement is conducted under the aforementioned conditions, and the elements are identified on the basis of the obtained X-ray peak positions. The concentration of each element is calculated from the counting rate (unit: cps), which is the number of X-ray photons per unit time. As for the method for quantifying an element in the toner, for example, the silicon content is determined as follows. First, to 100 parts by mass of the toner particles, 0.5 parts by mass of a silica ($SiO_2$) fine powder is added, and the resulting mixture is thoroughly mixed in a coffee mill. Similarly, 2.0 parts by mass of the silica fine powder and 5.0 parts by mass of the silica fine powder are respectively mixed to the toner so as to prepare calibration curve samples.

For each of the samples, a pellet of a calibration curve sample is prepared as described above using the tablet compressor, and the counting rate (unit: cps) of the Si—K α radiation observed at a diffraction angle (2θ) of 109.08° is measured with PET as the dispersive crystal. During this process, the acceleration voltage and the current value of the X-ray generator are, respectively, 24 kV and 100 mA. A calibration curve of a linear function is obtained by plotting the obtained X-ray counting rate on the vertical axis and the amount of added $SiO_2$ in each calibration curve sample on the horizontal axis. Next, the toner to be analyzed is formed into a pellet by using a tablet compressor as described above, and the counting rate of the Si—K α radiation is measured. The organic silicon polymer content in the toner is then determined from the aforementioned calibration curve. The ratio of the amount of the element in the water-washed toner to the amount of the element in the initial toner as calculated by the aforementioned method is determined and used as the adhering ratio (%).

EXAMPLES

The present invention will now be described in detail through examples below which do not limit the present invention. The "parts" and "%" of each material in Examples and Comparative Examples are on a mass basis unless otherwise noted.

Example 1

Aqueous Medium 1 Preparation Step

To 1000.0 parts of ion exchange water in a reactor, 14.0 parts of sodium phosphate (dodecahydrate) (produced by RASA Industries, LTD.) was added, and the temperature was kept at 65° C. for 1.0 hour under nitrogen purging. While stirring the mixture with a T.K. Homomixer (produced by Tokushu Kika Kogyo Co., Ltd.) at 12000 rpm, an aqueous solution of calcium chloride prepared by dissolving 9.2 parts of calcium chloride (dihydrate) to 10.0 parts of ion exchange water was added to the mixture at once to prepare an aqueous medium containing a dispersion stabilizer. A 10 mass % hydrochloric acid was added to the aqueous medium to adjust the pH to 5.0, and an aqueous medium 1 was obtained as a result.

Step of Hydrolyzing Organic Silicon Compound for Surface Layer

Into a reactor equipped with a stirrer and a thermometer, 60.0 parts of ion exchange water was weighed, and the pH was adjusted to 3.0 by using 10 mass % hydrochloric acid. While stirring the mixture, the temperature was adjusted to 70° C. Subsequently, 40.0 parts of methyltriethoxysilane serving as an organic silicon compound for a surface layer was added thereto, followed by stirring for 2 hours or more to perform hydrolysis. Completion of the hydrolysis was visually confirmed when oil and water no longer separated and formed one layer, followed by cooling. As a result, a hydrolyzed liquid of the organic silicon compound for a surface layer was obtained.

Step of Preparing Polymerizable Monomer Composition

Styrene: 50.0 parts

Carbon black (Nipex 35 produced by Orion Engineered Carbon): 7.0 parts

The aforementioned materials were placed in an attritor (produced by Mitsui Miike Chemical Engineering Machinery, Co., Ltd.) and dispersed with zirconia beads 1.7 mm in diameter at 220 rpm for 5.0 hours to prepare a pigment dispersion liquid. The following materials were added to the aforementioned pigment dispersion liquid.

Styrene: 20.0 parts n-Butyl acrylate: 30.0 parts

Crosslinking agent (divinyl benzene): 0.3 parts

Saturated polyester resin: 5.0 parts (polycondensation product between propylene oxide-modified bisphenol A (2 mol adduct) and terephthalic acid (molar ratio of 10:12), glass transition temperature Tg=68° C., weight-average molecular weight Mw=10000, molecular weight distribution Mw/Mn=5.12)

Fischer-Tropsch wax (melting point: 78° C.): 7.0 parts

The resulting mixture was kept at a temperature of 65° C., and homogeneously dissolved and dispersed at 500 rpm by using a T.K. Homomixer (produced by Tokushu Kika Kogyo Co., Ltd.) so as to prepare a polymerizable monomer composition.

Particle Forming Step

While the temperature of the aqueous medium 1 was kept at 70° C. and the rotation rate of the T.K. Homomixer was kept at 12000 rpm, the polymerizable monomer composition was added to the aqueous medium 1, and 9.0 parts of t-butylperoxy pivalate serving as a polymerization initiator was added thereto. While maintaining 12000 rpm with the stirrer, particles were formed for 10 minutes.

Polymerization Step

After the particle forming step, the stirrer was replaced by a propeller stirring blade, and, while the mixture is being stirred at 150 rpm, polymerization was carried out for 5.0 hours by holding a temperature to 70° C., and the polymerization reaction was performed by elevating the temperature to 85° C. and heating at that temperature for 2.0 hours to obtain core particles. The temperature of the slurry containing the core particle was decreased to 55° C., and the pH was measured. The pH value was 5.0. While stirring was continued at 55° C., formation of the surface layer of the toner was started by adding 20.0 parts of the hydrolyzed liquid of the organic silicon compound for a surface layer. After the mixture was held under the same condition for 30 minutes, the resulting slurry was adjusted to a pH of 9.0 for terminating condensation by using an aqueous solution of sodium hydroxide, and the slurry was held under this condition for 300 minutes to form surface layers.

Washing and Drying Step

Upon completion of the polymerization step, the slurry of toner particles was cooled, hydrochloric acid was added to the slurry of toner particles to adjust the pH to 1.5 or less, and the resulting mixture was stirred for 1 hour and left to stand still. Then solid-liquid separation was performed with a vacuum filter to obtain a toner cake. The toner cake was again formed into a slurry with ion exchange water to again prepare a dispersion liquid, and the dispersion liquid was subjected to solid-liquid separation by the aforementioned filter. Preparation of slurry and solid-liquid separation were repeated until the electrical conductivity of the filtrate was 5.0 μS/cm or less, and then solid-liquid separation was performed for the last time to obtain a toner cake.

The obtained toner cake was dried in an air stream drier, Flashjet Drier (produced by Seishin Enterprise Co., Ltd.), and coarse particles were removed by using a multizone classifier that utilizes the Coanda effect. As a result, toner particles 1 were obtained. The conditions of drying were adjusted such that the blowing temperature was 90° C., the dryer outlet temperature was 40° C., and the toner cake feeding speed was adjusted according to the water content in the toner cake so that the outlet temperature does not deviate from 40° C.

Silicon mapping was performed in the cross-sectional TEM observation of the toner particles 1 to confirm that silicon atoms were present in the surface layers and that the ratio of the number of dividing axes on which the thickness of the surface layers of the toner particles containing the organic silicon polymer was 2.5 nm or less was 20.0% or less. In the subsequent examples also, the same silicon mapping was performed to confirm that the silicon atoms were present in the surface layers and that the ratio of the number of dividing axes on which the thickness of the surface layers was 2.5 nm or less was 20.0% or less. In this example, the obtained toner particles 1 were directly used as the toner 1 without external addition.

The methods for evaluating the toner 1 are as follows.

Measurement of Martens Hardness

Hardness is one of the mechanical properties of a surface or the vicinity of the surface of a physical body and indicates the resistance of the physical body to deformation or damage when a foreign matter causes deformation or damage on the physical body. There are various measurement methods and definitions for the hardness. For example, the measurement method is selected according to the size of the region to be measured. For example, when the region to be measured is 10 μm or more, a Vickers method is employed. When the region to be measured is 10 μm or less, a nanoindentation method is employed. When the region to be measured is 1 μm or less, an atomic force microscope (AFM) method is used. Examples of the definition of the hardness include a Brinell hardness and a Vickers hardness as the indentation hardness, a Martens hardness as the scratching hardness, and a Shore hardness as the rebound hardness. These definitions are used as appropriate.

Since the typical particle diameter of is 3 μm to 10 μm, a nanoindentation method may be used to measure the toner. According to the studies conducted by the inventors, the Martens hardness that indicates the scratching resistance was appropriate for defining the hardness that offers the effects of the present invention. This is presumably because the scratching hardness can indicate the strength of the toner against being scratched by hard substances, such as metals and external additives, inside a developing unit.

The method for measuring the Martens hardness of the toner by a nanoindentation method involves obtaining a load-displacement curve by the procedure of an indentation test described in ISO 14577-1 by using a commercially available device that conforms with ISO 14577-1, and calculating the hardness from the load-displacement curve. In the present invention, a nanoindentation tester "ENT-1100b" (produced by ELIONIX INC.) was used as the device that conforms with the ISO standard. The measurement method is described in "ENT1100 operation manual" of the device. The specific measurement method was as follows.

The measurement environment inside a shield case was kept at 30.0° C. by using an attached temperature controller. Keeping the atmosphere temperature constant is effective for reducing variation of the measurement data caused by thermal expansion, drifting, and the like. The temperature was set to 30.0° C., which is the estimated temperature near the developing device in which the toner is rubbed. A standard sample stage attached to the device was used as the sample stage. After the toner was applied, weak air was blown to scatter the toner, and the sample stage was loaded onto the device. After retaining the sample stage thereat for at least 1 hour, the measurement was started.

A flat indenter having a 20 μm square tip (titanium indenter with a diamond tip) attached to the device was used as the indenter for measurement. The measurement accuracy is significantly affected if a pointed indenter is used to measure small spherical bodies, bodies with external additives attached thereto, and bodies having surface irregularities, such as the toner. Thus, a flat indenter was used. The maximum load for testing was set at $2.0\times10^{-4}$ N. The hardness can be measured under conditions corresponding to the stress one toner particle receives in the developing portion but without breaking the surface layer of the toner by setting the test load to this value. In the present invention, friction resistance is important, and it is critical that the hardness be measured without breaking the surface layers.

Toner particles that were isolated from other particles in a measurement image (size of field of view: 160 μm in width, and 120 μm in length) taken by a microscope attached to the device were selected as the particles to be measured. In order to minimize errors in the displacement amount, those particles which had a particle diameter (D) within the range of ±0.5 μm of the number-average particle diameter (D1) ("D1−0.5 μm" is equal to or smaller than D, and D is equal to or smaller than "D1+0.5 μm") were selected. The particle diameters of the particles to be measured were determined by measuring the long axis and the short axis of a toner particle by using software packaged with the device, and determining the diameter D (μm) by [(long axis length+short axis length)/2]. The number-average particle diameter was measured by using Coulter Counter Multisizer 3 (produced by Beckman Coulter Inc.) by the method described below.

The measurement was conducted by selecting one hundred toner particles that have a particle diameter D (μm) that satisfies the aforementioned condition. The conditions input for the measurement were as follows.

Test mode: load-unload test

Test load: 20.000 mgf (=$2.0\times10^{-4}$ N)

Partition number: 1000 steps

Step interval: 10 msec

When measurement is performed by selecting the analysis menu "data analysis (ISO)", the Martens hardness is analyzed by the software packaged with the device after the measurement, and output. This measurement was performed on one hundred toner particles, and the arithmetic mean was used as the Martens hardness in the present invention.

Method for Measuring Adhering Ratio

Measurement was performed by the method described in "Method for measuring physical properties of toner".

Evaluation of Printouts

A modified model of a commercially available laser beam printer LBP7600C produced by CANON KABUSHIKI KAISHA was used. The modification involved modifying the body of the device for evaluation and the software used therewith so that the rotation speed of the developing roller was 1.8 times the original circumferential velocity. Specifically, whereas the rotation speed of the developing roller before modification was 200 mm/sec in terms of circumferential velocity, the rotation speed after modification was 360 mm/sec.

Into a toner cartridge of LBP7600C, 40 g of the toner was loaded. The toner cartridge was left to stand in a normal temperature, normal humidity (NN) (25° C./50% RH) environment for 24 hours. After twenty-four hours, the toner cartridge was attached to LBP7600C in the same environment.

The charge rising was evaluated in the NN environment after an image having a printing ratio of 35.0% was printed out on 4,000 sheets of A4 paper having landscape orientation. The charge rising was also evaluated at the initial stage.

Evaluation of Development Streaks

A halftone (toner coating amount: 0.2 $mg/cm^2$) was printed out on a letter-size XEROX4200 sheet (produced by XEROX Corporation, 75 $g/m^2$), and development streaks were evaluated. Rating C or higher was determined to be acceptable.

Evaluation Standard

A: No vertical streaks extending in the paper discharging direction were observed on the developing roller or the image.

B: Five or less thin streaks extending in the circumferential direction were observed on both sides of the developing roller. Alternatively, vague vertical streaks extending in the paper discharging direction were observed on the image.

B: Six or more and twenty or less thin streaks extending in the circumferential direction were observed on both sides of the developing roller. Alternatively, five or less thin streaks were observed on the image.

D: Twenty-one or more streaks were observed on the developing roller. Alternatively, one or more noticeable streaks or six or more thin streaks were observed on the image.

Evaluation of Ghost

An image constituted by alternating 3 cm-width solid image vertical lines and 3 cm-width blank vertical lines was continuously printed on 10 sheets, and then a halftone image was printed on one sheet. The history of the previous image remaining on the image was visually evaluated. The image density of the halftone image was adjusted such that the reflectance density determined by reflectance density measurement with a Macbeth densitometer (produced by Macbeth) and an SPI filter was 0.4.

A: No ghost occurred.

B: The history of the previous image is vaguely visible in some part.

C: The history of the previous image is visible in some part.

D: The history of the previous image is visible in all parts.

Evaluation of Cleaning Property

A halftone image having a toner coating amount of 0.2 $mg/cm^2$ was printed on five sheets, and the cleaning property was evaluated. A: Images with cleaning failure are not found, and contamination of the charging roller is not found.

B: Images with cleaning failure are not found, but contamination of the charging roller is found.

C: Minor cleaning failure is observed on the halftone image.

D: Major cleaning failure is found on the halftone image.

Evaluation of Charge Rising

A solid image was output on ten sheets. During the course of printing out the tenth sheet, the machine was forcibly shut down, and the toner charge amount on the developing roller immediately after passing the regulating blade was measured. The charge amount on the developing roller was measured by using a Faraday cage illustrated in the perspective view of FIG. 6. The interior (the right side in the drawing) was put to a depressurized state so as to suction the toner on the developing roller, and the toner was captured by installing a toner filter 33. The Faraday cage 13 also included a suction portion 31 and holders 32. The mass M of the captured toner and the charge Q directly measured with a Coulomb meter were used to calculate the charge amount per unit mass, Q/M [μC/g], and the result was graded as the toner charge amount (Q/M) as follows.

A: Less than −40 μC/g

B: −40 μC/g or more but less than −30 μC/g

C: −30 μC/g or more but less than −20 μC/g

D: −20 μC/g or more

Examples 2 to 12

Toners were prepared as in Example 1 except that the conditions under which the hydrolyzed liquid was added and the holding time after the addition in the "polymerization step" were changed as indicated in Table 1. The pH of the slurry was adjusted by using hydrochloric acid and an aqueous sodium hydroxide solution. The obtained toners were evaluated as in Example 1. The evaluation results are indicated in Table 2.

Examples 13 to 18

Toners were prepared as in Example 1 except that the organic silicon compound for the surface layer used in the "step of hydrolyzing organic silicon compound for surface layer" was changed as indicated in Table 1. The obtained toners were evaluated as in Example 1. The evaluation results are indicated in Table 2.

Examples 19 to 23

Toners were prepared as in Example 1 except that the conditions under which the hydrolyzed liquid was added in the "polymerization step" were changed as indicated in Table 1. The obtained toners were evaluated as in Example 1. The evaluation results are indicated in Table 2.

Comparative Examples 1 and 2

Toners were prepared as in Example 1 except that the conditions under which the hydrolyzed liquid was added and the holding time after the addition in the "polymerization step" were changed as indicated in Table 1. The obtained toners were evaluated as in Example 1. The evaluation results are indicated in Table 2.

Comparative Example 3

The "step of hydrolyzing the organic silicon compound for the surface layer" was not performed. Alternatively, 8 parts of methyltriethoxysilane still in the monomer form and serving as an organic silicon compound for a surface layer was added during the "step of preparing the polymerizable monomer composition".

In the "polymerization step", after pH was measured after cooling to 70° C., the hydrolyzed liquid was not added. While continuing stirring at 70° C., the slurry was adjusted to a pH of 9.0 for terminating condensation by using an aqueous solution of sodium hydroxide, and the slurry was held under this condition for 300 minutes to form surface layers.

A toner was prepared as in Example 1 except for the aforementioned changes. The obtained toner was evaluated as in Example 1. The evaluation results are indicated in Table 2.

Comparative Example 4

The amount of methyltriethoxysilane added in the "step of preparing a polymerizable monomer composition" in Comparative Example 3 was changed to 15 parts.

A toner was prepared as in Comparative Example 3 except for the aforementioned change. The obtained toner was evaluated as in Example 1. The evaluation results are indicated in Table 2.

Comparative Example 5

The amount of methyltriethoxysilane added in the "step of preparing a polymerizable monomer composition" in Comparative Example 3 was changed to 30 parts.

A toner was prepared as in Comparative Example 3 except for the aforementioned change. The obtained toner was evaluated as in Example 1. The evaluation results are indicated in Table 2.

Comparative Example 6

Production Example of Binder Resin 1

Terephthalic acid: 25.0 mol %
Adipic acid: 13.0 mol %
Trimellitic acid: 8.0 mol %
Propylene oxide-modified bisphenol A (2.5 mol adduct): 33.0 mol %
Ethylene oxide-modified bisphenol A (2.5 mol adduct): 21.0 mol %

Into a four-necked flask, a total of 100 parts of the aforementioned acid components and alcohol components, and 0.02 parts of tin 2-ethylhexanoate serving as an esterification catalyst were charged. A depressurizing device, a water separation device, a nitrogen gas introducing device, a temperature meter, and a stirrer were attached to the flask, and the temperature was increased to 230° C. in a nitrogen atmosphere to conduct the reaction. Upon termination of the reaction, the product was taken out of the reactor, cooled, and pulverized to obtain a binder resin 1.

Production Example of Binder Resin 2

A binder resin 2 was prepared as with the binder resin 1 except that the monomer composition ratio and the reaction temperature were changed as follows.

Terephthalic acid: 50.0 mol %
Trimellitic acid: 3.0 mol %
Propylene oxide-modified bisphenol A (2.5 mol adduct): 47.0 mol %
Reaction temperature: 190° C.

Production Example of Comparative Toner 6

Binder resin 1: 70.0 parts
Binder resin 2: 30.0 parts
Magnetic iron oxide particles: 90.0 parts
(Number-average particle diameter: 0.14 μm, Hc=11.5 kA/m, σs=84.0 $Am^2/kg$, σr=16.0 $Am^2/kg$)
Fischer-Tropsch wax (melting point: 105° C.): 2.0 parts
Charge controller 1 (structural formula below): 2.0 parts Charge controller 1

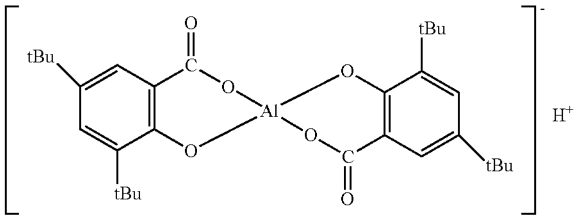

In the formula, tBu represents tert-butyl.

The above-described materials were pre-mixed in a Henschel mixer, and melt-kneaded in a twin-screw kneader extruder having three kneading zones and a screw zone. During this process, the heating temperature in the first kneading zone close to the supply port was set to 110° C., the heating temperature in the second kneading zone was set to 130° C., the heating temperature in the third kneading zone was set to 150° C., the paddle rotation speed was set to 200 rpm, and a kneaded product obtained as a result of melt-kneading under these conditions was cooled. After the cooled product was roughly pulverized in a hammer mill, the roughly pulverized product was disintegrated with a fine disintegrator using a jet stream. The resulting finely disintegrated powder was classified with a multizone classifier that utilized the Coanda effect. As a result, toner particles having a weight-average particle diameter of 7.0 μm were obtained.

To 100 parts of the toner particles, 1.0 part of hydrophobic silica fine powder (BET: 140 $m^2/g$, subjected to silane coupling treatment and silicone oil treatment, hydrophobicity: 78%) and 3.0 parts of strontium titanate (D50: 1.2 μm) were externally added, and the resulting mixture was screened through a mesh having an aperture of 150 μm to obtain a comparative toner 6. The obtained toner was evaluated as in Example 1. The evaluation results are indicated in Table 2.

Comparative Example 7

Magnetic toner particles 1 described in the examples in Japanese Patent Laid-Open No. 2015-45860 were prepared. A magnetic material serving as a filler was present in the binder, and the surfaces were heat treated. The obtained toner was evaluated as in Example 1. The evaluation results are indicated in Table 2.

TABLE 1

| | Number of parts of added polymerization initiator | Number of parts of added crosslinking agent | Type of organic silicon compound for surface layer | Conditions of adding hydrolyzed solution 1: pH of slurry | Conditions of adding hydrolyzed solution 1: Temperature of slurry (° C.) | Conditions of adding hydrolyzed solution 1: Number of parts of added hydrolyzed solution 1 | Condition after addition of hydrolyzed solution 1: Length of holding time until pH was adjusted to terminate condensation |
|---|---|---|---|---|---|---|---|
| Example 1 | 9.0 | 0.3 | Methyltriethoxysilane | 5.0 | 55 | 20 | 30 |
| Example 2 | 9.0 | 0.3 | Methyltriethoxysilane | 9.0 | 70 | 20 | 0 |

TABLE 1-continued

| | Number of parts of added polymerization initiator | Number of parts of added crosslinking agent | Type of organic silicon compound for surface layer | Conditions of adding hydrolyzed solution 1: pH of slurry | Conditions of adding hydrolyzed solution 1: Temperature of slurry (° C.) | Conditions of adding hydrolyzed solution 1: Number of parts of added hydrolyzed solution 1 | Condition after addition of hydrolyzed solution 1: Length of holding time until pH was adjusted to terminate condensation |
|---|---|---|---|---|---|---|---|
| Example 3 | 9.0 | 0.3 | Methyltriethoxysilane | 7.0 | 65 | 20 | 3 |
| Example 4 | 9.0 | 0.3 | Methyltriethoxysilane | 5.0 | 55 | 20 | 10 |
| Example 5 | 9.0 | 0.3 | Methyltriethoxysilane | 5.0 | 45 | 20 | 60 |
| Example 6 | 9.0 | 0.3 | Methyltriethoxysilane | 5.0 | 40 | 20 | 90 |
| Example 7 | 11.0 | 0 | Methyltriethoxysilane | 5.0 | 55 | 20 | 30 |
| Example 8 | 9.0 | 0 | Methyltriethoxysilane | 5.0 | 55 | 20 | 30 |
| Example 9 | 9.0 | 0.5 | Methyltriethoxysilane | 5.0 | 55 | 20 | 30 |
| Example 10 | 8.0 | 0.5 | Methyltriethoxysilane | 5.0 | 55 | 20 | 30 |
| Example 11 | 7.0 | 0.6 | Methyltriethoxysilane | 5.0 | 55 | 20 | 30 |
| Example 12 | 7.0 | 0.7 | Methyltriethoxysilane | 5.0 | 55 | 20 | 30 |
| Example 13 | 9.0 | 0.3 | Tetraethoxysilane | 5.0 | 55 | 20 | 30 |
| Example 14 | 9.0 | 0.3 | Dimethydiethoxysilane | 5.0 | 55 | 20 | 30 |
| Example 15 | 9.0 | 0.3 | Trimethylethoxysilane | 5.0 | 55 | 20 | 30 |
| Example 16 | 9.0 | 0.3 | n-Propyltriethoxysilane | 5.0 | 55 | 20 | 30 |
| Example 17 | 9.0 | 0.3 | Phenyltriethoxysilane | 5.0 | 55 | 20 | 30 |
| Example 18 | 9.0 | 0.3 | Hexyltriethoxysilane | 5.0 | 55 | 20 | 30 |
| Example 19 | 9.0 | 0.3 | Methyltriethoxysilane | 5.0 | 85 | 20 | 30 |
| Example 20 | 9.0 | 0.3 | Methyltriethoxysilane | 5.0 | 55 | 38 | 30 |
| Example 21 | 9.0 | 0.3 | Methyltriethoxysilane | 5.0 | 55 | 75 | 30 |
| Example 22 | 9.0 | 0.3 | Methyltriethoxysilane | 5.0 | 55 | 13 | 30 |
| Example 23 | 9.0 | 0.3 | Methyltriethoxysilane | 5.0 | 55 | 3 | 30 |
| Comparative Example 1 | 9.0 | 0.3 | Methyltriethoxysilane | 9.5 | 75 | 20 | 0 |
| Comparative Example 2 | 9.0 | 0.3 | Methyltriethoxysilane | 5.0 | 35 | 20 | 150 |
| Comparative Example 3 | 9.0 | 0.3 | Methyltriethoxysilane | Addition was performed in a dissolving step without performing hydrolysis. Refer to the description. | | | |
| Comparative Example 4 | 9.0 | 0.3 | Methyltriethoxysilane | | | | |
| Comparative Example 5 | 9.0 | 0.3 | Methyltriethoxysilane | | | | |
| Comparative Example 6 | Refer to the description. | | | | | | |
| Comparative Example 7 | | | | | | | |

TABLE 2

| | Martens hardness (MPa): Maximum load $2.0 \times 10^{-4}$N | Martens hardness (MPa): Maximum load $9.8 \times 10^{-4}$N | Adhering ratio of organic silicon polymer (%) | Development streaks | Ghost | Cleaning property | Charge rising: Initial stage: Charge amount (μC/g) | Charge rising: Initial stage: Rating | Charge rising: After printing 4000 sheets: Charge amount (μC/g) | Charge rising: After printing 4000 sheets: Rating | Replenishment fogging Occurred or not |
|---|---|---|---|---|---|---|---|---|---|---|---|
| Example 1 | 598 | 23 | 97 | A | A | A | −35.2 | B | −26.3 | C | None |
| Example 2 | 203 | 12 | 96 | C | C | A | −36.2 | B | −23 | C | None |
| Example 3 | 251 | 16 | 95 | B | B | A | −36.2 | B | −25.3 | C | None |
| Example 4 | 316 | 21 | 96 | A | A | A | −35.6 | B | −25.9 | C | None |
| Example 5 | 980 | 33 | 97 | B | A | A | −35.7 | B | −26.1 | C | None |
| Example 6 | 1092 | 42 | 95 | C | A | A | −35.7 | B | −25.8 | C | None |
| Example 7 | 536 | 3 | 96 | B | A | A | −36.5 | B | −26.1 | C | None |
| Example 8 | 562 | 5 | 95 | B | A | A | −36.6 | B | −26.9 | C | None |
| Example 9 | 606 | 53 | 96 | A | A | A | −35.2 | B | −25.9 | C | None |
| Example 10 | 618 | 78 | 96 | A | A | A | −35.1 | B | −25.4 | C | None |
| Example 11 | 623 | 99 | 95 | A | A | B | −36.2 | B | −26.1 | C | None |
| Example 12 | 633 | 111 | 96 | A | A | C | −35.7 | B | −26.2 | C | None |
| Example 13 | 960 | 33 | 92 | B | A | A | −30.2 | B | −25.1 | C | None |
| Example 14 | 386 | 22 | 93 | A | A | A | −36.2 | B | −25.3 | C | None |
| Example 15 | 301 | 20 | 91 | A | A | A | −37.5 | B | −26.1 | C | None |
| Example 16 | 423 | 22 | 90 | A | A | A | −38.7 | B | −25.6 | C | None |
| Example 17 | 350 | 21 | 92 | A | A | A | −37.4 | B | −26.1 | C | None |

TABLE 2-continued

| | Martens hardness (MPa) | | Adhering ratio of organic silicon polymer (%) | Development streaks | Ghost | Cleaning property | Charge rising | | | | Replenishment |
|---|---|---|---|---|---|---|---|---|---|---|---|
| | | | | | | | Initial stage | | After printing 4000 sheets | | |
| | Maximum load 2.0 × $10^{-4}$N | Maximum load 9.8 × $10^{-4}$N | | | | | Charge amount (μC/g) | Rating | Charge amount (μC/g) | Rating | fogging Occurred or not |
| Example 18 | 328 | 21 | 93 | A | A | A | −36.9 | B | −25.1 | C | None |
| Example 19 | 550 | 23 | 85 | B | B | A | −38.4 | B | −23.1 | C | None |
| Example 20 | 750 | 28 | 92 | A | A | A | −39.2 | B | −26.4 | C | None |
| Example 21 | 950 | 33 | 90 | B | A | A | −39.6 | B | −29 | C | None |
| Example 22 | 430 | 22 | 95 | A | A | A | −34.2 | B | −25.4 | C | None |
| Example 23 | 220 | 12 | 96 | C | C | A | −28.9 | C | −21 | C | None |
| Comparative Example 1 | 185 | 10 | 90 | D | D | A | −35.5 | B | −18.5 | D | Occurred |
| Comparative Example 2 | 1200 | 50 | 91 | D | A | A | −36.2 | B | −15 | D | Occurred |
| Comparative Example 3 | 89 | 50 | 89 | D | D | A | −36.9 | B | −15.5 | D | Occurred |
| Comparative Example 4 | 185 | 70 | 88 | D | D | A | −37.1 | B | −18.3 | D | Occurred |
| Comparative Example 5 | 153 | 150 | 85 | D | D | D | −35.4 | B | −19.2 | D | Occurred |
| Comparative Example 6 | 43 | 51 | — | D | D | A | −38.2 | B | −18.6 | D | Occurred |
| Comparative Example 7 | 186 | 50 | — | D | D | A | −37.8 | B | −20.3 | D | Occurred |

Effects of Toner

As indicated in the tables, by adjusting the Martens hardness to 200 [MPa] or more and 1100 [MPa] or less, the wear resistance of the toner in the developing portion improved significantly compared to the typical toner, and changes in toner triboelectrification caused by printing could be suppressed compared to the related art. As a result, the increase in the amount of the accumulated degraded toner with degraded chargeability can be suppressed. In addition, occurrence of replenishment fogging can be suppressed, and the image is improved since less development streaks and ghost occur.

When changes in toner triboelectrification are decreased and replenishment fogging is suppressed, downtime and complicated operations such as measuring the developing current are no longer necessary. Moreover, as in the aforementioned embodiments, even when the image forming apparatus has a structure in which old toner inside the developing device rapidly comes in contact with a replenished new toner during replenishment, replenishment fogging does not occur, and the downtime required for the toner replenishment can be significantly reduced.

The tables also indicate that the effects of the present invention are not satisfactorily obtained when the Martens hardness is lower than 200 MPa.

External Additives

The toner particles may be used as the toner without any external additives; however, in order to further improve the flowability, the chargeability, the cleaning property, and the like, a fluidizer, a cleaning aid, and other external additives may be added to the toner particles, and the resulting mixture may be used as the toner.

Examples of the external additives include inorganic oxide fine particles such as silica fine particles, alumina fine particles, and titanium oxide fine particles, and inorganic stearate compound fine particles such as aluminum stearate fine particles and zinc stearate fine particles. Other examples include inorganic titanate compound fine particles such as strontium titanate and zinc titanate. These may be used alone or in combination of two or more.

The total amount of these external additives added relative to 100 parts by mass of the toner particles is preferably 0.05 parts by mass or more and 5 parts by mass or less and more preferably 0.1 parts by mass or more and 3 parts by mass or less. Various external additives may be used in combination.

The toner may have positively charged particles on the surfaces of the toner particles. The number-average particle diameter of the positively charged particles is preferably 0.10 μm or more and 1.00 μm or less and more preferably 0.20 μm or more and 0.80 μm or less.

When such positively charged particles are provided, the transfer efficiency is excellent throughout endurance and use. The positively charged particles having such a particle diameter can roll on the surfaces of the toner particles, and promotes negative charging of the toner as the particles are rubbed between the photosensitive drum and the transfer belt. Presumably as a result of this, positive charging caused by application of the transfer bias is suppressed. The toner of the present invention characteristically has hard surfaces, and thus the positively charged particles do not easily adhere to or become embedded in the toner particle surfaces. Thus, high transfer efficiency can be maintained. Examples of the positively charged particles include hydrotalcite, titanium oxide, and melamine resins. Among these, hydrotalcite is particularly preferable.

The toner may have boron nitride on the surfaces of the toner particles. Boron nitride may be provided to the toner particle surfaces by any method, and, for example, boron nitride may be externally added to the toner particle surfaces. It has been found that, as long as the Martens hardness of the toner is within the range of the present invention, boron nitride can exist on the toner particle surface evenly and at a high adhering ratio, and degradation of the adhering ratio is small throughout endurance and use.

Modifications

When the toner bottle 12 is attached to the opening 34, the toner bottle 12 may be arranged not to protrude upward and on the outer side of the outer casing of the device and may be arranged to be housed inside the apparatus, although this has a drawback of an increased apparatus size compared to the case described in the respective embodiments. In this case also, a developer can be replenished by a simpler system that involves moving a toner from the toner bottle 12 to the developer housing chamber 37 by using the weight of the toner itself. In addition, a synergetic effect is obtained by using the toner described in the third embodiment since replenishment fogging and the increase in the amount of the accumulated degraded toner can be further suppressed even when toner replenishment is continued by using a new toner bottle 12 every time the toner has run out. It should be noted that although a new toner bottle is used for replenishing, other process units such as photosensitive drum 1 and the developing device 3 are not subject to replacement.

According to the aforementioned description, it is possible to provide a mechanism that enables developer replenishment by a simpler structure and a mechanism that enables more user-friendly developer replenishment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming system comprising:

a developer supply container configured to contain developer; and an image forming apparatus that includes an image bearing member, a developer bearing member, a frame that supports the developer bearing member and constitutes a developer receiving container, and a stirring member that is rotatable in the developer receiving container, wherein the developer receiving container is configured to contain a developer to be supplied to the developer bearing member, and the developer receiving container has an attachment port to which a developer supply container is detachably attached and through which the developer contained in the developer supply container is supplied to the developer receiving container;

a cover movable between a first position in which the cover covers the attachment port and a second position in which the cover does not cover the attachment port to allow the developer supply container to be attached to the attachment port, the cover being prevented from being moved from the second position to the first position by the developer supply container attached to the attachment port; and a detecting unit for detecting whether the developer supply container is attached to the attachment port, wherein in a case where the detecting unit detects that the developer supply container is attached to the attachment port, an execution of an image forming operation is unallowable.

2. The image forming system according to claim 1, wherein the developer supply container includes a developer housing portion that is bag-shaped and is formed by a flexible sheet, and wherein, when the bag is deformed by force applied to the developer supply container by user, the developer contained in the bag is supplied to the developer receiving container through the attachment port.

3. The image forming system according to claim 2, wherein a thickness of the flexible sheet is from 0.03 millimeter (mm) to 1 mm.

4. The image forming system according to claim 2, wherein the flexible sheet is a paper.

5. The image forming system according to claim 1, wherein the attachment port is provided in a protruding portion protruding upward with respect to an upper surface of the developer receiving container.

6. The image forming system according to claim 5, wherein the protruding portion is provided in an end portion of the developer housing portion in a direction of a rotational axis of the image bearing member.

7. The image forming system according to claim 6, wherein the protruding portion of the developer housing portion is overlapped with the developer bearing member when viewed in a direction orthogonal to the rotational axis of the image bearing member.

8. The image forming system according to claim 1, wherein the developer supply container is attached to the attachment port with an opening of the developer supply container facing downward, and wherein the opening is provided for discharging of developer to an outside of the developer supply container.

9. The image forming system according to claim 1, wherein the image forming operation includes a driving of the image bearing member.

10. The image forming system according to claim 1, wherein the image bearing member is a photosensitive drum, and the developer bearing member is a developing roller.

11. The image forming system according to claim 10, wherein the stirring member includes a rotating shaft and a sheet.

12. The image forming system according to claim 10, wherein the stirring member is only one in an area between the attachment port and the image bearing member in the developer receiving container.

13. The image forming system according to claim 1, wherein the image forming apparatus includes a memory reading unit, and wherein the detecting unit is a memory unit including an electrical contact which contacts the memory reading unit when the developer supply container is attached to attachment port.

* * * * *